(12) United States Patent
Dong et al.

(10) Patent No.: US 12,164,754 B2
(45) Date of Patent: Dec. 10, 2024

(54) TERMINAL CONTROL METHOD AND APPARATUS, AND TERMINAL DEVICE

(71) Applicant: Huawei Technologies Co., Ltd., Guangdong (CN)

(72) Inventors: Ming Dong, Nanjing (CN); Haijun Wang, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/921,482

(22) PCT Filed: Mar. 23, 2021

(86) PCT No.: PCT/CN2021/082247
§ 371 (c)(1),
(2) Date: Oct. 26, 2022

(87) PCT Pub. No.: WO2021/218493
PCT Pub. Date: Nov. 4, 2021

(65) Prior Publication Data
US 2023/0205400 A1    Jun. 29, 2023

(30) Foreign Application Priority Data
Apr. 27, 2020   (CN) ......................... 202010343535.4

(51) Int. Cl.
*G06F 3/048*   (2013.01)
*G06F 3/0482*  (2013.01)
(Continued)

(52) U.S. Cl.
CPC .......... *G06F 3/0483* (2013.01); *G06F 3/0482* (2013.01); *G06F 3/04845* (2013.01); *G06F 3/0488* (2013.01); *G06F 2203/04803* (2013.01)

(58) Field of Classification Search
CPC .. G06F 3/0482; G06F 3/0483; G06F 3/04845; G06F 3/0488
See application file for complete search history.

(56) References Cited

U.S. PATENT DOCUMENTS

2010/0081475 A1* 4/2010 Chiang ............... H04M 1/2747
715/788
2012/0117121 A1* 5/2012 Thomas ................. G06F 16/25
707/796
(Continued)

FOREIGN PATENT DOCUMENTS

| CN | 106484262 A | 3/2017 |
| CN | 107273111 A | 10/2017 |

(Continued)

*Primary Examiner* — Claudia Dragoescu
(74) *Attorney, Agent, or Firm* — WOMBLE BOND DICKINSON (US) LLP

(57) ABSTRACT

This application provide a terminal control method and apparatus, and a terminal device. The method includes: in response to a first operation performed on a terminal device, controlling a screen of the terminal device to display at least two split-screen windows, where the at least two split-screen windows include a first split-screen window and a second split-screen window, and the first split-screen window is used to display a first page of a first application; setting the first page to a preset state in response to a second operation performed on the first split-screen window; and displaying the first page in the second split-screen window and displaying a second page of the first application in the first split-screen window in response to a third operation performed on the first page, where the second page is a previous page of the first page.

20 Claims, 20 Drawing Sheets

(51) Int. Cl.
    *G06F 3/0483*     (2013.01)
    *G06F 3/04845*     (2022.01)
    *G06F 3/0488*     (2022.01)

(56)     References Cited

U.S. PATENT DOCUMENTS

| | | | |
|---|---|---|---|
| 2012/0240056 A1* | 9/2012 | Webber | G09G 5/38 |
| | | | 715/752 |
| 2014/0237405 A1 | 8/2014 | Wu | |
| 2016/0351168 A1* | 12/2016 | Yan | G06F 9/451 |
| 2017/0357437 A1* | 12/2017 | Peterson | G06F 40/134 |
| 2019/0187893 A1 | 6/2019 | Gan et al. | |
| 2019/0306561 A1 | 10/2019 | Xu et al. | |
| 2022/0357845 A1 | 11/2022 | Luo | |

FOREIGN PATENT DOCUMENTS

| | | |
|---|---|---|
| CN | 107491258 A | 12/2017 |
| CN | 108509110 A | 9/2018 |
| CN | 108572773 A | 9/2018 |
| CN | 109388463 A | 2/2019 |
| CN | 109408174 A | 3/2019 |
| CN | 109462692 A | 3/2019 |
| CN | 110018920 A | 7/2019 |
| CN | 110456951 A | 11/2019 |
| CN | 110865744 A | 3/2020 |
| CN | 111694475 A | 9/2020 |
| KR | 20140055128 A | 5/2014 |
| WO | 2017113624 A1 | 7/2017 |

* cited by examiner

TERMINAL CONTROL METHOD AND APPARATUS, AND TERMINAL DEVICE

CROSS-REFERENCE TO RELATED APPLICATIONS

This application is a national stage of International Application No. PCT/CN2021/082247, filed on Mar. 23, 2021, which claims priority to Chinese Patent Application No. 202010343535.4, filed Apr. 27, 2020. Both of the aforementioned applications are hereby incorporated by reference in their entireties.

TECHNICAL FIELD

This application relates to the field of terminal device technologies, and in particular, to a terminal control method and apparatus, and a terminal device.

BACKGROUND

With continuous development of terminal devices, for an application (APP), a screen of the terminal device provides a plurality of operable pages at a same moment. This can effectively improve operation experience of a user.

Currently, the application in the terminal device usually provides the plurality of operable pages at the same moment in a picture-in-picture mode. The picture-in-picture mode is a special type of multi-window mode, and is mainly used in video playing. Usually, the terminal device triggers the picture-in-picture mode by using service logic of the application. For example, in response to a return operation, the terminal device displays a currently playing video in a picture-in-picture window.

However, in the foregoing triggering manner, the multi-window display cannot be performed on a page. As a result, the user cannot display the plurality of operable pages of the application at the same moment based on a requirement of the user, and this reduces operation flexibility of the terminal device.

SUMMARY

Embodiments of this application provide a terminal control method and apparatus, and a terminal device, to improve operation flexibility of the terminal device.

Some embodiments provide a terminal control method, applied to a terminal device including a screen, and the method includes: in response to a first operation performed on the terminal device, controlling the screen of the terminal device to display at least two split-screen windows, where the at least two split-screen windows include a first split-screen window and a second split-screen window, and the first split-screen window is used to display a first page of a first application; setting the first page to a preset state in response to a second operation performed on the first split-screen window; and displaying the first page in the second split-screen window and displaying a second page of the first application in the first split-screen window in response to a third operation performed on the first page, where the second page is a previous page of the first page.

By using the first operation in the foregoing process, the second operation, and the third operation, multi-window display for a page of the first application is actively implemented. This can effectively improve operation flexibility of the terminal device.

In some embodiments, the setting the first page to a preset state in response to a second operation performed on the first split-screen window may include:
in response to the second operation performed on the first split-screen window, determining whether the first page meets a preset condition; and if the first page meets the preset condition, setting the first page to the preset state.

Some pages are deliverable, but some pages are not deliverable. Therefore, when it is determined that the first page meets the preset condition, the first page may be set to the preset state. This can ensure setting the first page to the preset state.

In some embodiments, before the setting the first page to a preset state in response to a second operation performed on the first split-screen window, the method further includes:
determining a preset page list, where the preset page list includes a page that is deliverable in the first application.

The preset condition is that the preset page list includes the first page.

In the foregoing process, the preset page list is predetermined, so that the page that is in the first application and that is deliverable can be determined simply and efficiently.

In some embodiments, the setting the first page to a preset state includes:
obtaining a screenshot of the first page, and processing the screenshot of the first page to obtain a first floating window.

The screenshot of the first page is processed to obtain the first floating window, to provide a good visual effect for the user in a process of delivering the first page, so as to effectively improve user experience.

In some embodiments, the displaying the first page in the second split-screen window in response to a third operation performed on the first page includes:
in response to the third operation performed on the first page, moving the first floating window to the second split-screen window; and
displaying the first page in the second split-screen window based on the first floating window.

In the foregoing process, an effect of dynamically moving a page can be implemented by setting and moving the first floating window. This can improve operation experience and visual experience of the user.

In some embodiments, the displaying the first page in the second split-screen window based on the first floating window includes:
determining whether an overlap ratio between the first floating window and the second split-screen window is greater than or equal to a preset threshold; and
if yes, displaying the first page in the second split-screen window.

Whether to display the first page in the second split-screen window is determined based on an overlap ratio between the first floating window and the second split-screen window. This can effectively improve operation efficiency and convenience of the user, and effectively prevent a mis-operation of the user.

In some embodiments, the displaying the first page in the second split-screen window includes:
creating a new first activity stack when the third operation ends, where the first activity stack is used to indicate a page displayed in the second split-screen window; and
displaying the first page in the second split-screen window based on the first activity stack.

The new first activity stack is created to indicate the page displayed in the second split-screen window. In a process of page management and maintenance, creating the new first activity stack can effectively improve operation flexibility.

In some embodiments, the displaying the first page in the second split-screen window based on the first activity stack includes:

obtaining a first task record in which the first page is located, and determining whether the first task record includes only the first page;

if yes, binding the first task record to the first activity stack; and displaying the first page in the second split-screen window based on the first page included in the first task record bound to the first activity stack.

In some embodiments, if the first task record does not include only the first page, the method further includes:

creating a new second task record, moving the first page to the second task record, and binding the second task record to the first activity stack; and displaying the first page in the second split-screen window based on the first page included in the second task record bound to the first activity stack.

In the foregoing process, the page displayed in the second split-screen window is managed by creating the first activity stack, so that page management can be flexibly and efficiently implement ed. In addition, when the first task record includes only the first page, the existing first task record can be directly bound to the first activity stack, so that there is no need to create another activity stack. This can effectively reduce system memory overheads.

In some embodiments, in the first task record, the second page is a page adjacent to the first page.

In some embodiments, the first operation is an operation for triggering a split-screen mode, the second operation is a preset gesture operation, and the third operation is a sliding operation.

Some embodiments provide a terminal control apparatus, applied to a terminal device, where the terminal device includes a screen, and the terminal control apparatus includes a processing module and a display module.

The processing module is configured to: in response to a first operation performed on the terminal device, control the screen of the terminal device to display at least two split-screen windows, where the at least two split-screen windows include a first split-screen window and a second split-screen window, and the first split-screen window is used to display a first page of a first application.

The processing module is further configured to set the first page to a preset state in response to a second operation performed on the first split-screen window.

The display module is configured to display the first page in the second split-screen window and display a second page of the first application in the first split-screen window in response to a third operation performed on the first page, where the second page is a previous page of the first page.

In some embodiments, the processing module is configured to:

in response to the second operation performed on the first split-screen window, determine whether the first page meets a preset condition; and if yes, set the first page to the preset state.

In some embodiments, the processing module is further configured to:

before setting the first page to the preset state in response to the second operation performed on the first split-screen window, determine a preset page list, where the preset page list includes a page that is deliverable in the first application; and the preset condition is that the preset page list includes the first page.

In some embodiments, the processing module is configured to:

obtain a screenshot of the first page, and process the screenshot of the first page to obtain a first floating window.

In some embodiments, the display module is configured to:

in response to the third operation performed on the first page, move the first floating window to the second split-screen window; and display the first page in the second split-screen window based on the first floating window.

In some embodiments, the display module is configured to:

determine whether an overlap ratio between the first floating window and the second split-screen window is greater than or equal to a preset threshold; and if yes, display the first page in the second split-screen window.

In some embodiments, the display module is configured to:

create a new first activity stack when the third operation ends, where the first activity stack is used to indicate a page displayed in the second split-screen window; and display the first page in the second split-screen window based on the first activity stack.

In some embodiments, the display module is configured to:

obtain a first task record in which the first page is located, and determine whether the first task record includes only the first page;

if yes, bind the first task record to the first activity stack; and display the first page in the second split-screen window based on the first page included in the first task record bound to the first activity stack.

In some embodiments, the processing module is further configured to:

if the first task record does not include only the first page, create a new second task record, move the first page to the second task record, and bind the second task record to the first activity stack; and display the first page in the second split-screen window based on the first page included in the second task record bound to the first activity stack.

In some embodiments, in the first task record, the second page is a page adjacent to the first page.

In some embodiments, the first operation is an operation for triggering a split-screen mode, the second operation is a preset gesture operation, and the third operation is a sliding operation.

Some embodiments provide a terminal device, including:
a memory, configured to store a program; and
a processor, configured to execute the program stored in the memory, where when the program is executed, the processor is configured to perform the method according to some embodiments of the present disclosure.

Some embodiments provide a computer-readable storage medium including instructions. When the instructions are run on a computer, the computer is enabled to perform the method according to any one of the embodiments.

Embodiments of this application provide a terminal control method and apparatus, and a terminal device. The method includes: in response to a first operation performed on a terminal device, controlling a screen of the terminal device to display at least two split-screen windows, where the at least two split-screen windows include a first split-screen window and a second split-screen window, and the first split-screen window is used to display a first page of a first application; setting the first page to a preset state in response to a second operation performed on the first split-screen window; and displaying the first page in the second split-screen window and displaying a second page of the first application in the first split-screen window in response to a third operation performed on the first page, where the second page is a previous page of the first page. By using the first operation, the second operation, and the third operation, multi-window display for a page of the first application is actively implemented. This can effectively improve operation flexibility of the terminal device.

DESCRIPTION OF EMBODIMENTS

To facilitate understanding of this application, a concept of a terminal device in this application is first explained and described.

Terminal device: The terminal device in this application is a device including a display. For example, a plurality of APPs may be installed on the terminal device to provide a plurality of different functions for a user. The terminal device has a wireless connection function, and may communicate with one or more core networks through a radio access network. For example, the terminal device may be a mobile phone, a computer, a watch, a tablet, an in-vehicle device, a wearable device, an industrial device, an artificial intelligence device/augmented reality (AR) device, or a virtual reality (VR) device.

Figure 1:
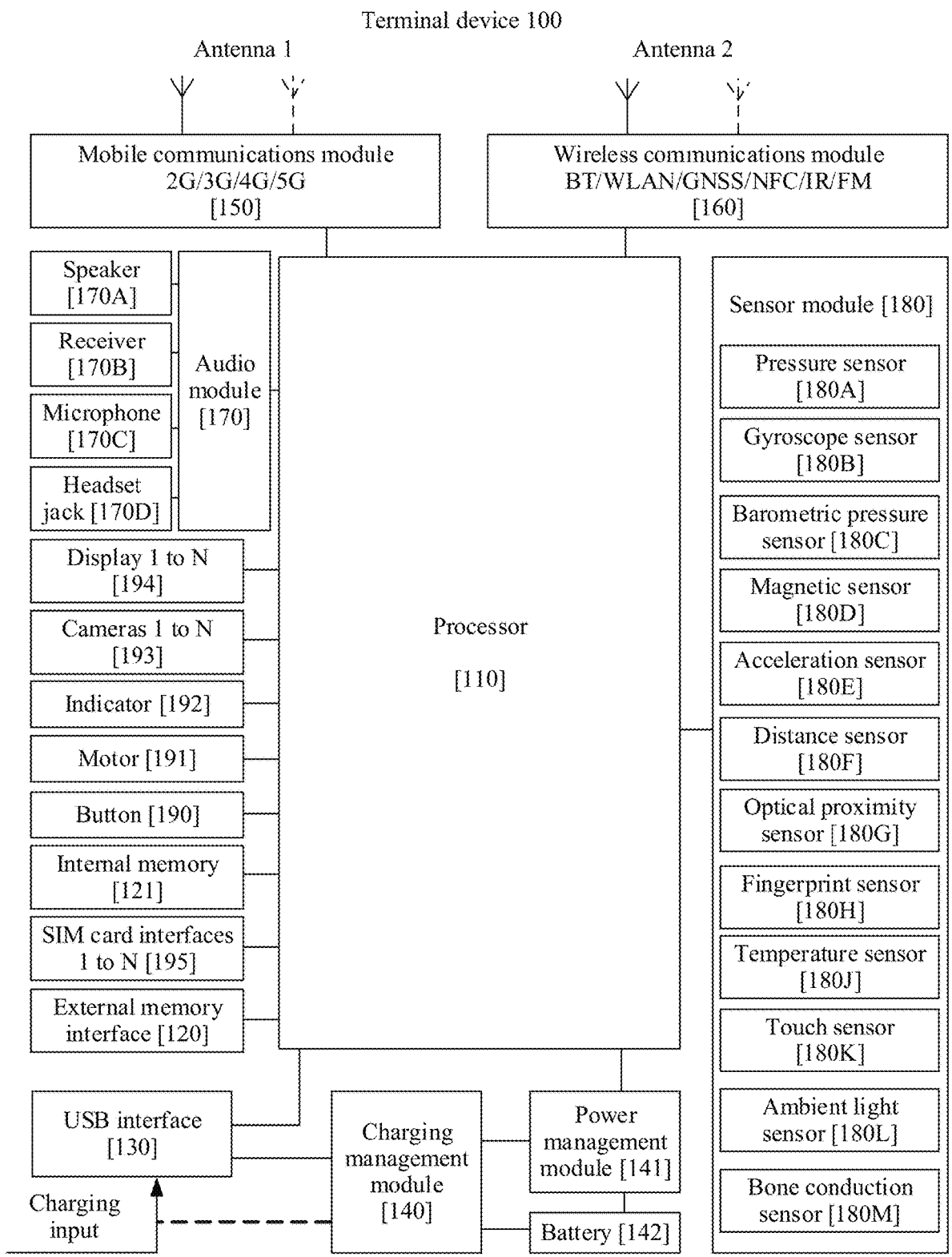
FIG. 1 is a schematic diagram of a structure of a terminal device according to an embodiment of this application.

The following describes a structure of the terminal device with reference to FIG. 1.

FIG. 1 is a schematic diagram of the structure of the terminal device according to an embodiment of this application. Refer to FIG. 1. A terminal device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of this application does not constitute a limitation on the terminal device 100. In some other embodiments of this application, the terminal device 100 may include more or fewer parts than those shown in the figure, or combine some parts, or split some parts, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access and reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement the function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement an image shooting function of the terminal device 100. The processor 110 communicates with the display 194 through the DSI interface to implement a display function of the terminal device 100.

It can be understood that an interface connection relationship between the modules illustrated in embodiments of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The mobile communications module 150 may provide a wireless communications solution applied to the terminal device 100, including 2G, 3G, 4G, 5G, or the like. The mobile communications module 150 may include at least one filter, a switch, a power amplifier, a low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A, the receiver 170B, or the like), or displays an image or a video on the display 194. In some embodiments, the modem processor may be an independent component. In some other embodiments, the modem processor may be independent of the processor 110, and is disposed in a same component as the mobile communications module 150 or another functional module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the terminal device 100. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the terminal device 100 is coupled to the mobile communications module 150, and the antenna 2 thereof is coupled to the wireless communications module 160, so that the terminal device 100 can communicate with a network and another device by using a wireless communication technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 100 may include one or N displays 194, where N is a positive integer greater than 1.

The terminal device 100 may implement the photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more video codecs. In this way, the terminal device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the terminal device 100, for example, image recognition, facial recognition, speech recognition, and text understanding, can be implemented by using the NPU.

The external memory interface 120 may be configured to connect to an external memory card, for example, a micro SD card, to extend a storage capability of the terminal device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application required by at least one function (for example, a voice playing function or an image playing function), and the like. The data storage region may store data (for example, audio data or a phone book) created in a process of using the terminal device 100. In addition, the internal memory 121 may include a high-speed random access memory, or may include a nonvolatile memory, for example, at least one magnetic disk storage device, a flash memory, or a universal flash storage (UFS). The processor 110 performs various function applications and data processing of the terminal device 100 by running the instructions stored in the internal memory 121 and/or the instructions stored in the memory disposed in the processor.

The terminal device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be configured to encode and decode an audio signal. In some embodiments, the audio module 170 may be disposed in the processor 110, or some functional modules in the audio module 170 are disposed in the processor 110.

Based on the structure of the terminal device described above, the following further describes in detail the background of this application.

Currently, in a process in which a user uses an APP on a terminal device, for a same APP, the terminal device usually presents only one operable page to the user at one moment. In this way, the user can operate only a single function in the APP.

With development of a multi-window function of an Android system, a plurality of windows can be displayed on a screen of a terminal device at a same moment, so that a user can perform different operations at a same moment. This effectively extends operation flexibility of the terminal device. In addition, with development of a foldable display, a screen of the terminal device becomes larger, and each of the plurality of windows becomes larger correspondingly. Based on development of the current multi-window function and the foldable display technology, the user can implement different function operations in different windows based on a same APP. This can reduce the user's frequent switching between different tasks, to perform a plurality of task operations.

It should be noted herein that the foldable display is described only to describe embodiments of different function operations in different windows based on a same APP, and does not mean that the method provided in embodiments of this application can be applied only to a terminal device with a foldable display. The method provided in embodiments of this application may be applied to the terminal device with the foldable display, and may also be applied to a terminal device with a non-foldable display.

Figure 2:
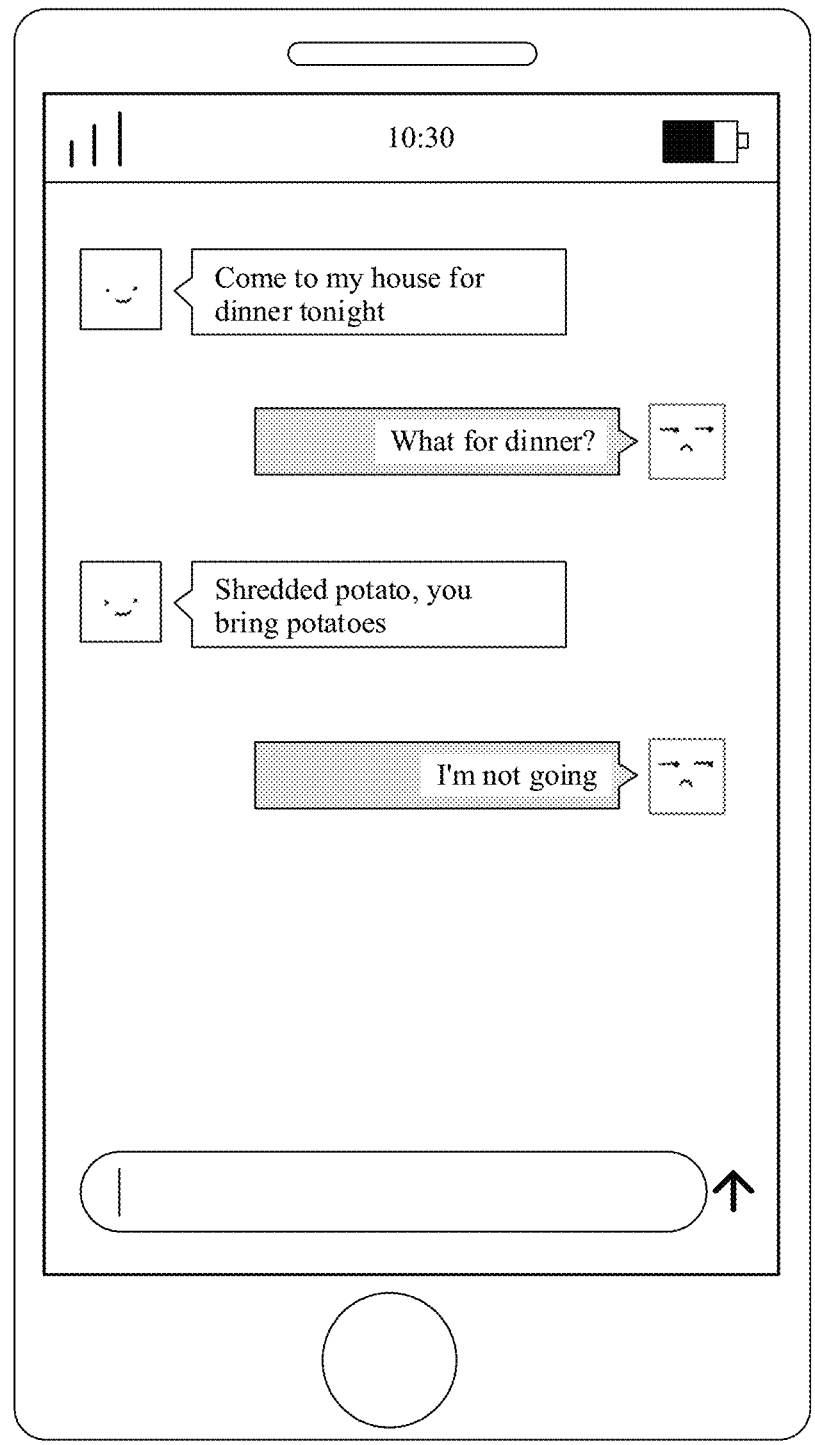
FIG. 2 is a schematic diagram of a terminal device in a full-screen mode according to an embodiment of this application.
Figure 3:
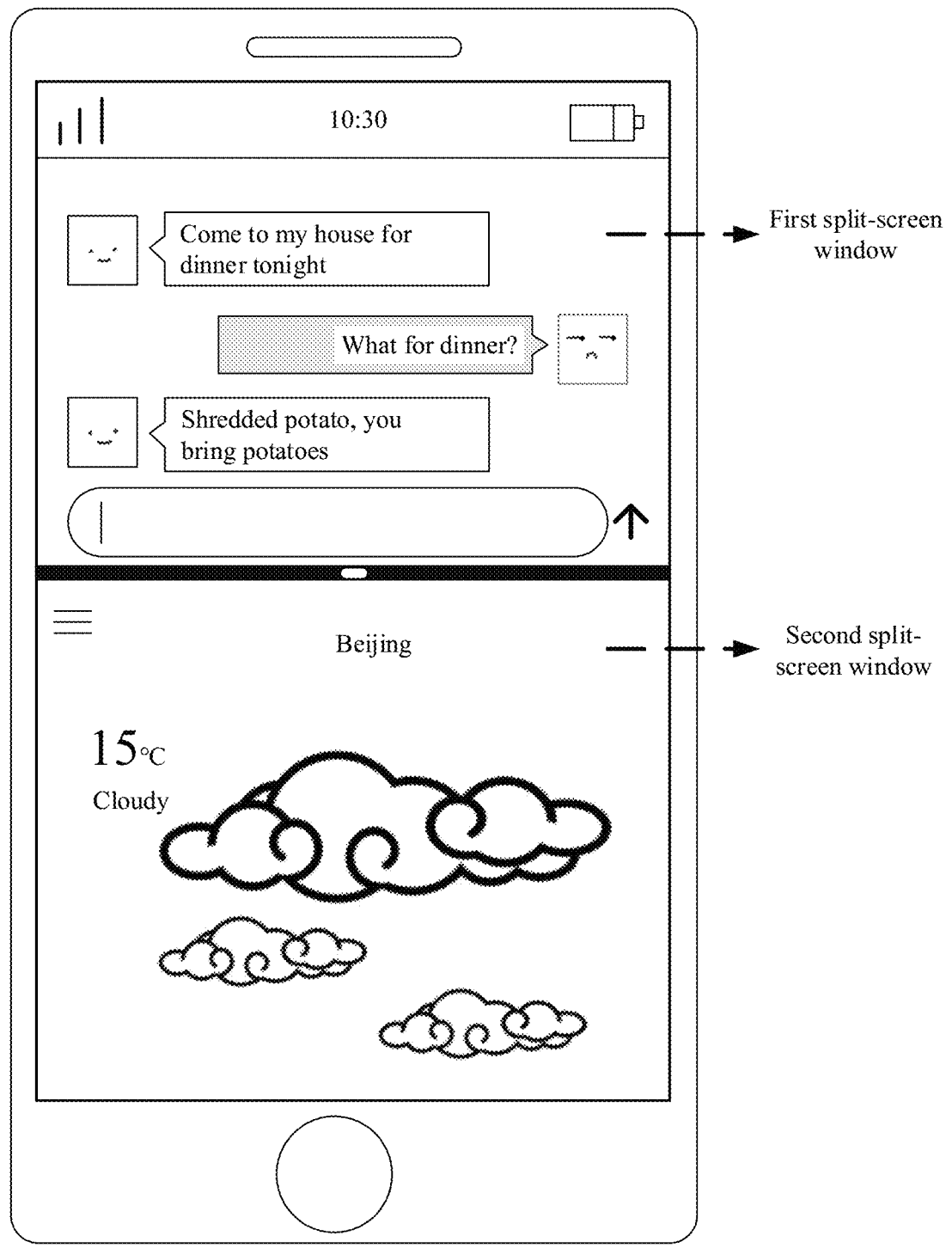
FIG. 3 is a schematic diagram of a terminal device in a split-screen mode according to an embodiment of this application.
Figure 4:
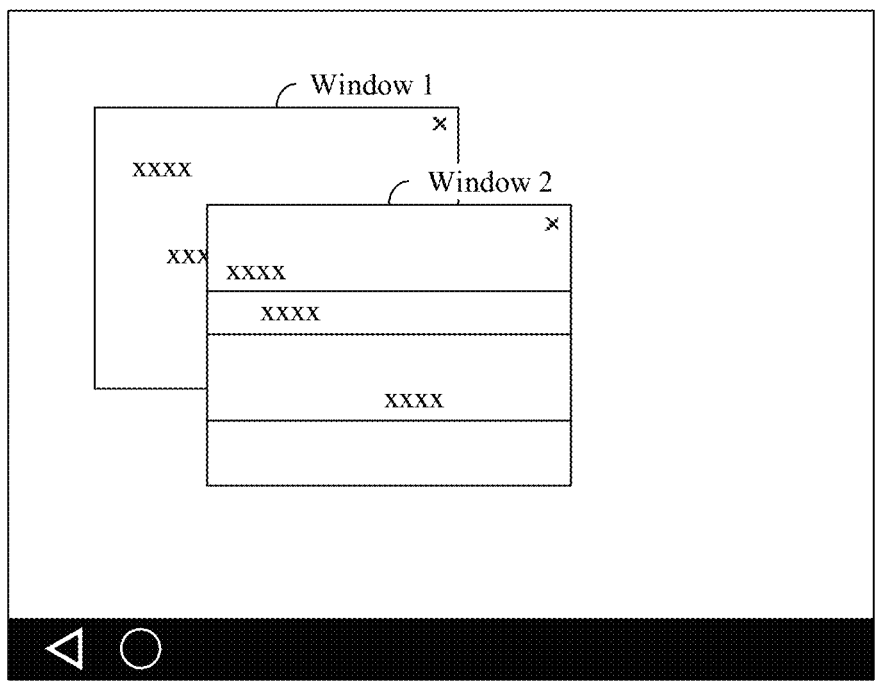
FIG. 4 is a schematic diagram of a terminal device in a FreeForm mode according to an embodiment of this application.
Figure 5:
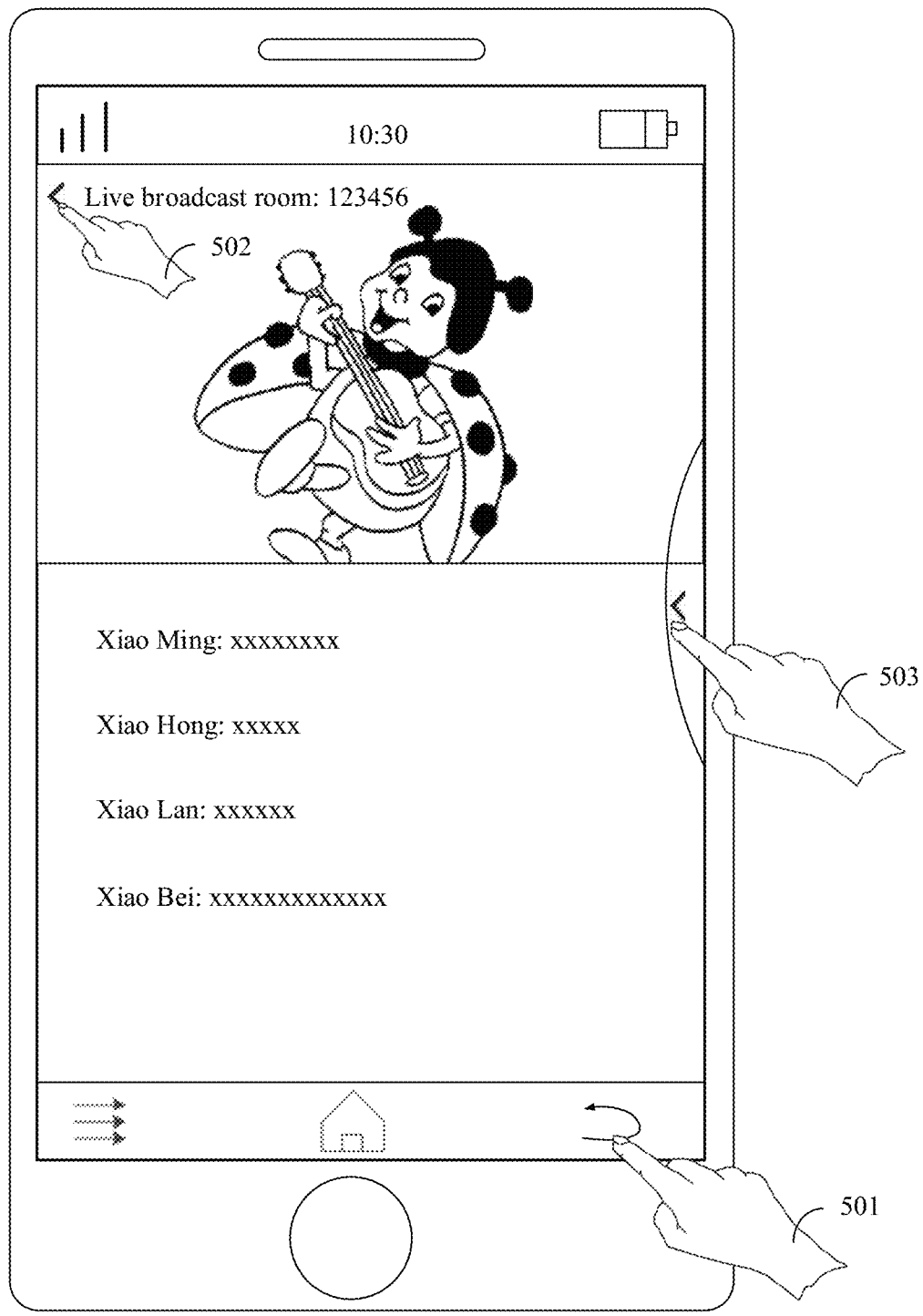
FIG. 5 is a schematic diagram of an operation of triggering a picture-in-picture mode according to an embodiment of this application.
Figure 6:
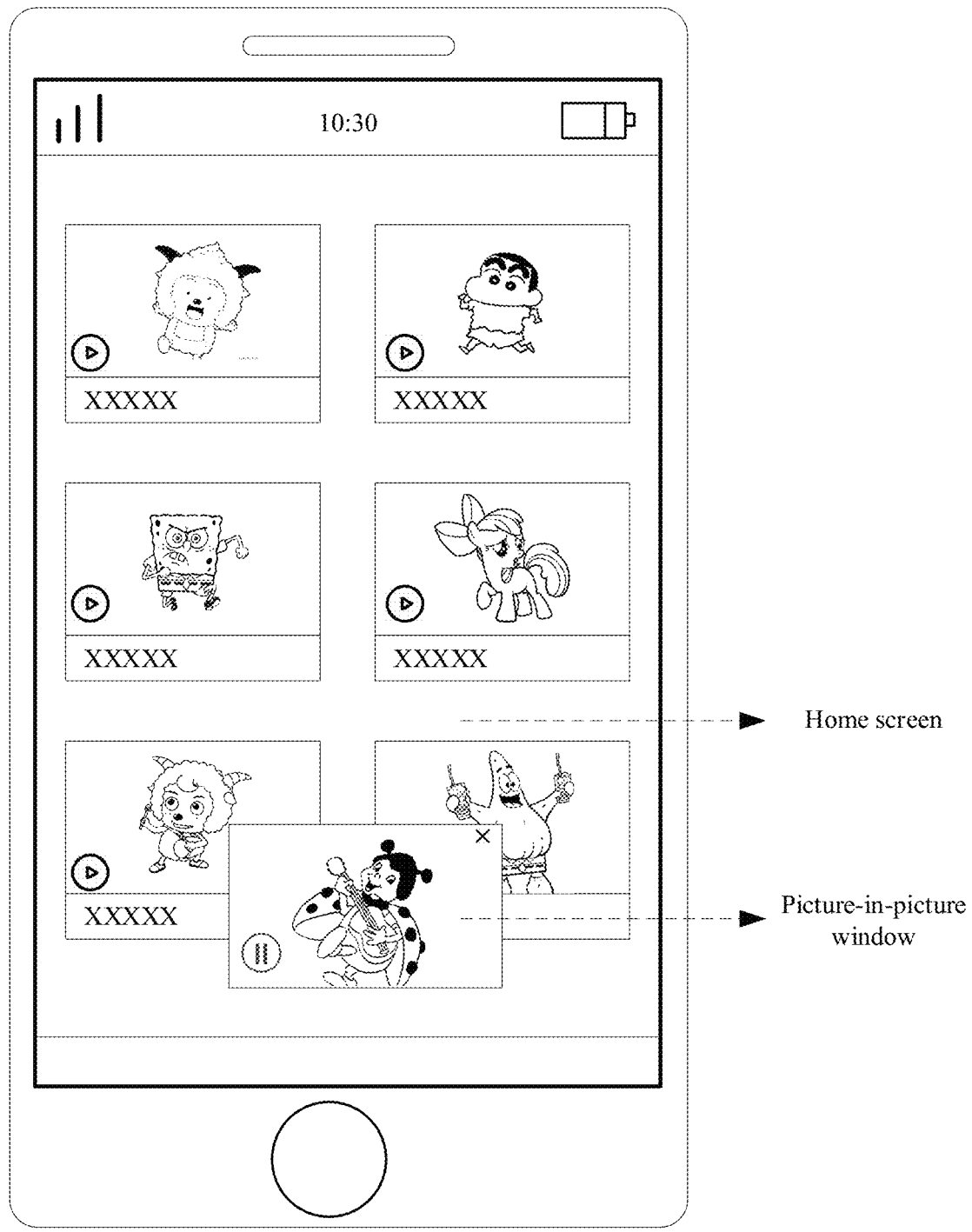
FIG. 6 is a schematic diagram of a terminal device in a picture-in-picture mode according to an embodiment of this application.

Currently, a native multi-window function of an Android system supports four modes: a full-screen mode, a split-screen mode, a FreeForm mode, and a picture-in-picture mode. The following separately describes, with reference to FIG. 2 to FIG. 5, multi-window functions of the four modes supported by the Android system. FIG. 2 is a schematic diagram of a terminal device in a full-screen mode according to an embodiment of this application. FIG. 3 is a schematic diagram of a terminal device in a split-screen mode according to an embodiment of this application. FIG. 4 is a schematic diagram of a terminal device in a FreeForm mode according to an embodiment of this application. FIG. 5 is a schematic diagram of an operation of triggering a picture-in-picture mode according to an embodiment of this application. FIG. 6 is a schematic diagram of a terminal device in a picture-in-picture mode according to an embodiment of this application.

The full-screen mode is first described with reference to FIG. 2. Refer to FIG. 2. A chat application A is used as an example. In the full-screen mode, only a chat page of the chat application A is displayed on a screen of a terminal device. In this case, the terminal device can display only one operable page of the chat application A at a same moment, for example, the chat page shown in FIG. 2. If the user currently wants to perform an operation on a home page of the chat application A, the terminal device cannot display the current chat page. That is, in the full-screen mode, the terminal device cannot display different pages of the same app at the same moment.

The split-screen mode is then described with reference to FIG. 3. Refer to FIG. 3. In the split-screen mode, two windows may be displayed on a screen of a terminal device. It is assumed that the two windows are a first split-screen window and a second split-screen window. However, in the conventional technology, applications displayed in the two split-screen windows in the split-screen mode are different applications. For example, refer to FIG. 3. In the first split-screen window, a page of a chat application A is displayed, and in the second split-screen window, a page of a weather application B is displayed.

In some embodiments, although the split-screen mode is supported in the conventional technology, pages of different applications are still displayed in different split-screen windows, and the user still cannot operate different pages of a same application at a same moment.

The following describes the FreeForm mode with reference to FIG. 4. The FreeForm mode is similar to a desktop operating system of a computer, and a window of an application interface may be freely dragged and resized. Refer to FIG. 4. It is assumed that a window 1 and a window 2 are currently displayed on a screen of a terminal device. The window 1 and the window 2 display pages of different applications. That is, in the FreeForm mode, different operation pages of a same application cannot be displayed at a same moment.

The following describes the picture-in-picture mode with reference to FIG. 5 and FIG. 6. The picture-in-picture (PIP) mode is a special type of multi-window mode, and is mainly used in video playing. In the PIP mode, a terminal device may allow a user to watch a video in a small window pinned at a corner of a screen while navigating between applications or browsing content of the terminal device on a home screen.

The PIP uses a multi-window application programming interface (API) provided in Android 7.0 to provide a pinned video coverage window. In an actual use process, a developer may register an activity that supports the PIP based on an actual requirement, and add the PIP to an application, so that the application can display a page in the PIP mode. In some embodiments, the activity may be switched to the PIP mode based on a requirement, it is ensured that UI elements are hidden, and a video continues to be played when the activity is in the PIP mode.

The following describes a manner of triggering the PIP mode. The PIP mode is triggered based on service logic of an application in the conventional technology. For example, the service logic of the application may designed as follows: When the terminal device receives a return operation input by the user, the terminal device is triggered to enter the picture-in-picture mode. The return operation may be, for example, 501, 502, and 503 shown in FIG. 5.

In an actual triggering process, for example, when the application receives a return operation, service logic of entering the picture-in-picture mode of the application is triggered. For example, it may be determined whether parameters (android: supportsPictureInPicture and android: resizeableActivity) of an activity in a file (AndroidManifest.xml) are true. If yes, the currently displayed activity invokes a function (enterPictureInPictureMode) to enter the picture-in-picture mode, and displays a page of the activity in a picture-in-picture window.

An activity component is a presentation layer of an Android operating system, and each page of an application based on the Android operating system may be an activity component.

The following describes a display manner of the picture-in-picture mode with reference to FIG. 6. Refer to FIG. 6. A video application C is used as an example. In the PIP mode, the picture-in-picture window and the home screen may be displayed on the screen of the terminal device. The picture-in-picture window may display a video currently being played in the video application C. On the home screen, for example, a home page of the video window C (as shown in FIG. 6) may be displayed, another application that supports displaying a picture-in-picture window may be displayed, or the home screen of the terminal device may be displayed. Content displayed on the home screen is not particularly limited in this embodiment.

In some embodiments, the PIP window appears at the topmost layer of the screen, and is located in a corner selected by the system. The terminal device may drag the PIP window to another position in response to a movement operation of the user. In addition, when the user taps the PIP window, for example, two special controls may appear in the PIP window: a full-screen switch button (located in the center of the window) and a close button ("X" in the upper right corner).

Based on this description, it may be determined that, in the picture-in-picture mode, the screen of the terminal device may display different operation pages of a same application at a same moment, but an operation page can only be triggered based on service logic of the application. It is assumed that an application includes a page 1, a page 2, and a page 3. For example, if trigger logic is set for the page 1 in service logic of the application, when a trigger operation is detected, the page 1 may be displayed in the picture-in-picture window. For another example, if no trigger logic is set for the page 2 and the page 3 in the service logic of the application, the terminal device cannot display the page 2 and the page 3 in the picture-in-picture window.

In some embodiments, the user cannot perform an active operation on a page to implement multi-window display of the application. As a result, the user cannot display a plurality of operable pages of the application at the same moment based on a requirement, and this reduces operation flexibility of the terminal device.

Currently, the picture-in-picture mode is usually used in video playing, in particular, in live video playing. For a non-video playing application, there is no effective manner to display a plurality of operable pages of one application at a same moment.

Based on this, this application proposes the following technical concept: In the split-screen mode, different operation pages of a same application are separately displayed in the first split-screen window and the second split-screen window based on a user operation, so that the user actively triggers multi-window display of a page.

Figure 7:
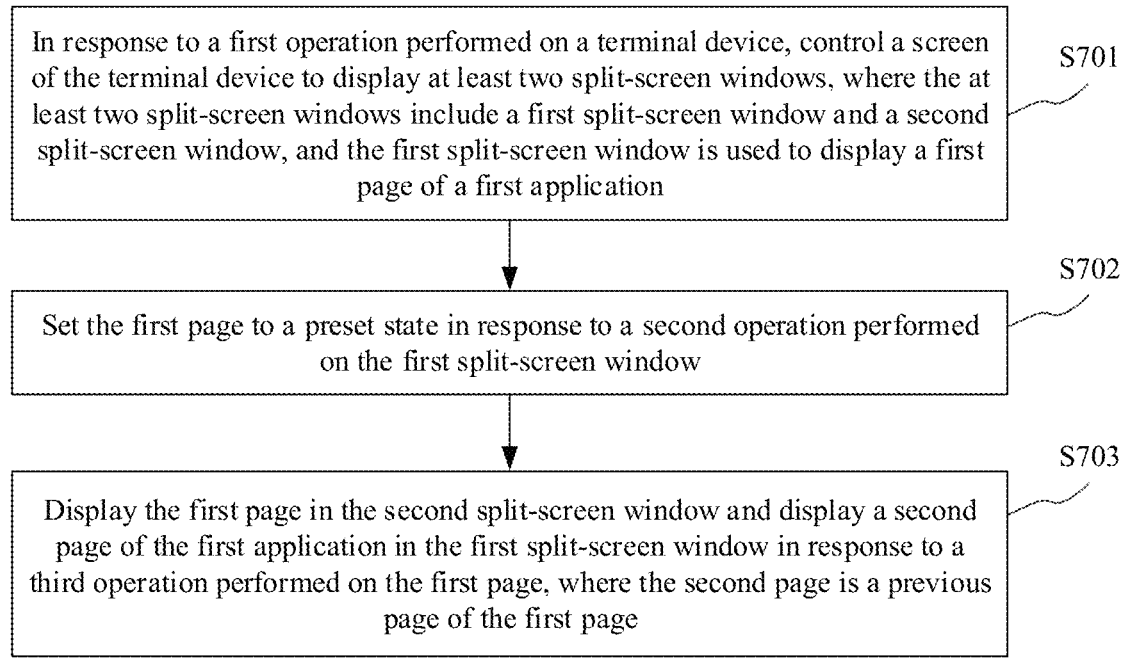
FIG. 7 is a flowchart 1 of a terminal control method according to an embodiment of this application.

The following describes in detail a terminal control method provided in an embodiment of this application with reference to FIG. 7. FIG. 7 is a flowchart 1 of a terminal control method according to an embodiment of this application. As shown in FIG. 7, the method includes the following operations.

S701: In response to a first operation performed on a terminal device, control a screen of the terminal device to display at least two split-screen windows, where the at least two split-screen windows include a first split-screen window and a second split-screen window, and the first split-screen window is used to display a first page of a first application.

In this embodiment, the first operation is an operation used to trigger a split-screen mode. In some embodiments, for example, the first operation may be an operation of sliding up from a bottom of the terminal device; the first operation may be a series of operations of first tapping a menu button and then tapping a virtual split-screen button provided on the screen; the first operation may be a double-tap operation; the first operation may be an operation of pressing a physical button; or the first operation may be a voice input operation.

In response to the first operation, the terminal device controls the screen of the terminal device to display the at least two split-screen windows. The at least two split-screen windows include the first split-screen window and the second split-screen window. The first split-screen window and the second split-screen window may be any two of the at least two split-screen windows, and locations of the first split-screen window and the second split-screen window on the screen may also be any two locations. This is not limited in this embodiment.

The first split-screen window in this embodiment is used to display the first page of the first application. The first application is a currently opened application that needs to display different pages, and the first page is a page that is of the first application and that is being displayed when split-screen is triggered.

S702: Set the first page to a preset state in response to a second operation performed on the first split-screen window.

After the at least two split-screen windows are displayed on the screen of the terminal device, to display different pages of a same application on the screen of the terminal device at a same moment, different pages of the first application need to be displayed on the first split-screen window and the second split-screen window.

In addition, an embodiment of this application needs to enable the user to actively implement multi-window display on a page. In this embodiment, after the split-screen mode is entered and the first page of the first application is displayed in the first split-screen window, the first page may be set to the preset state in response to the second operation performed on the first split-screen window.

The preset state is used to indicate that the current first page is deliverable, or may be displayed in the multi-window mode. For example, the preset state may be a translucent state, or may be a preset text identifier.

It may be understood that, if the user currently needs to implement multi-window display on the first page, the user first triggers the split-screen mode by using the first operation, and then triggers, by using the second operation, the first page to enter the preset state. In other words, the user may perform an operation on a page that needs to be displayed in the multi-window mode, to implement multi-window display on a page.

S703: Display the first page in the second split-screen window and display a second page of the first application in the first split-screen window in response to a third operation performed on the first page, where the second page is a previous page of the first page.

When the first page is set to the preset state, it indicates that the first page is deliverable. In this case, in response to the third operation performed on the first page, the first page may be displayed in the second split-screen window instead of the first split-screen window. In this case, the first split-screen window displays the second page of the first application. The second page is a previous page of the first page. In other words, the second page is a page obtained after returning from the first page is performed.

By using the first operation, the second operation, and the third operation, the original displaying the first page in the first split-screen window is replaced with displaying the first page in the second split-screen window and displaying the second page in the first split-screen window, where both the first page and the second page are pages of the first application. In this way, a plurality of pages of the first application are provided on the screen of the terminal device at a same moment. In addition, multi-window display of the first application in this embodiment is implemented by the user by using the first operation, the second operation, and the third operation, so that multi-window display can be implemented on a page. This effectively improves operation flexibility of the terminal device.

It should be noted that this application describes the first split-screen window and the second split-screen window, but is not limited to embodiments of a mode of two split-screen windows. With subsequent development of a split-screen mode, if there is a third split-screen window and a fourth split-screen window, the method in this application is still applicable.

The terminal control method provided in this embodiment of this application includes: in response to the first operation performed on the terminal device, controlling the screen of the terminal device to display the at least two split-screen windows, where the at least two split-screen windows include the first split-screen window and the second split-screen window, and the first split-screen window is used to display the first page of the first application; setting the first page to the preset state in response to the second operation performed on the first split-screen window; and displaying the first page in the second split-screen window and displaying the second page of the first application in the first split-screen window in response to the third operation performed on the first page, where the second page is a previous page of the first page. By using the first operation, the second operation, and the third operation, multi-window display for a page of the first application is actively implemented. This can effectively improve operation flexibility of the terminal device.

Figure 8:
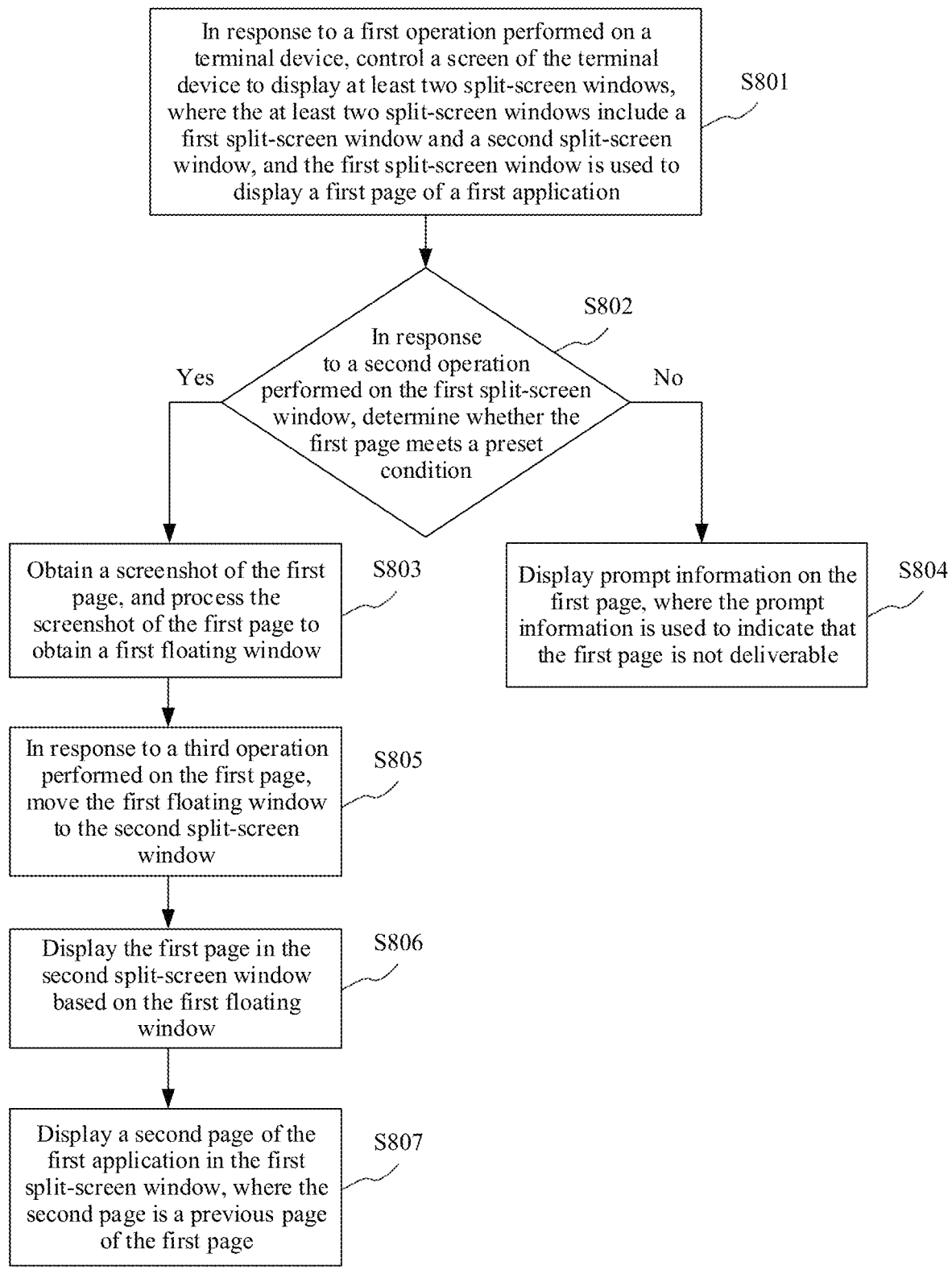
FIG. 8 is a flowchart 2 of a terminal control method according to another embodiment of this application.
Figure 9:
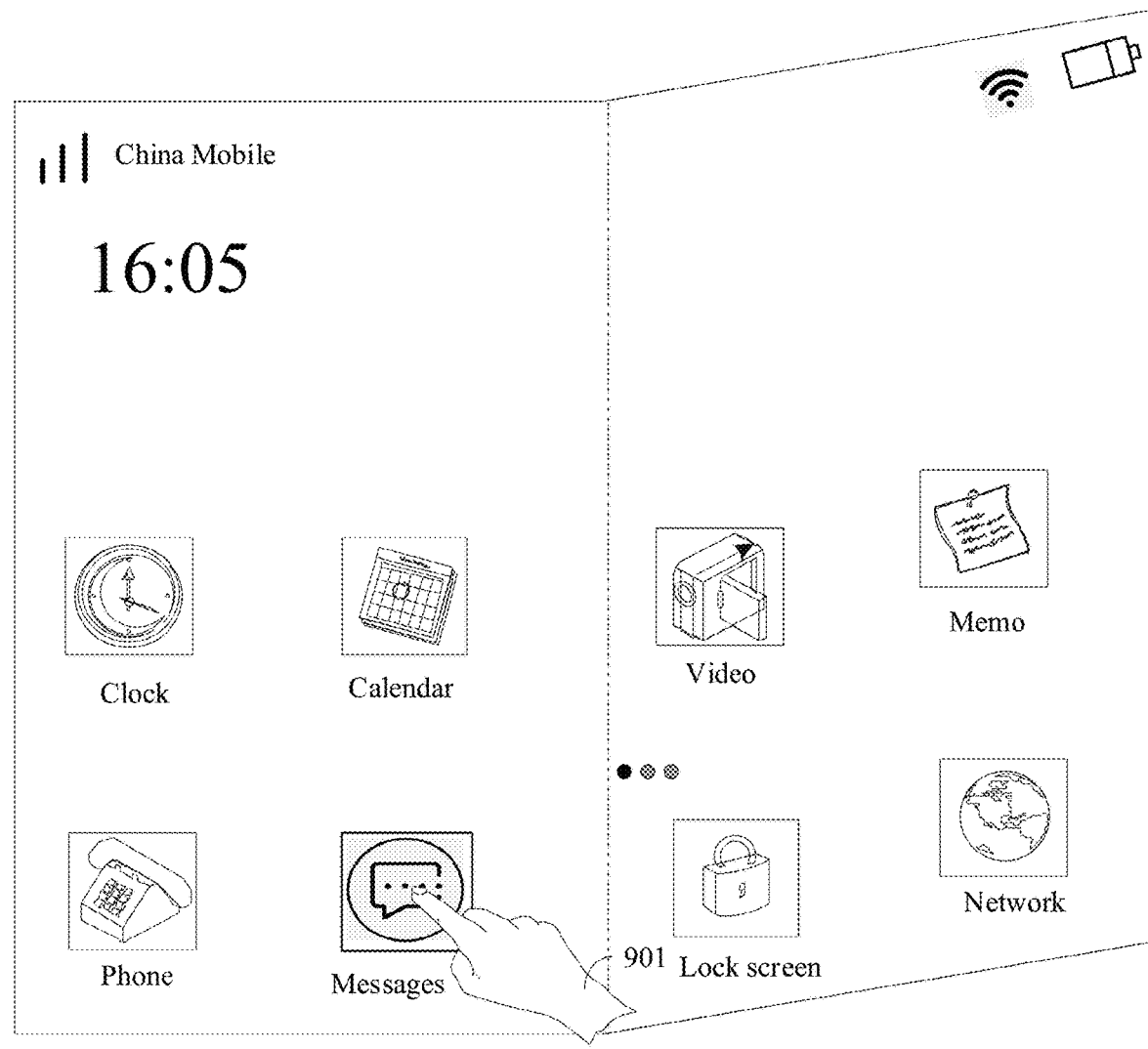
FIG. 9 is a schematic diagram 1 of an interface of a terminal device according to an embodiment of this application.
Figure 10:
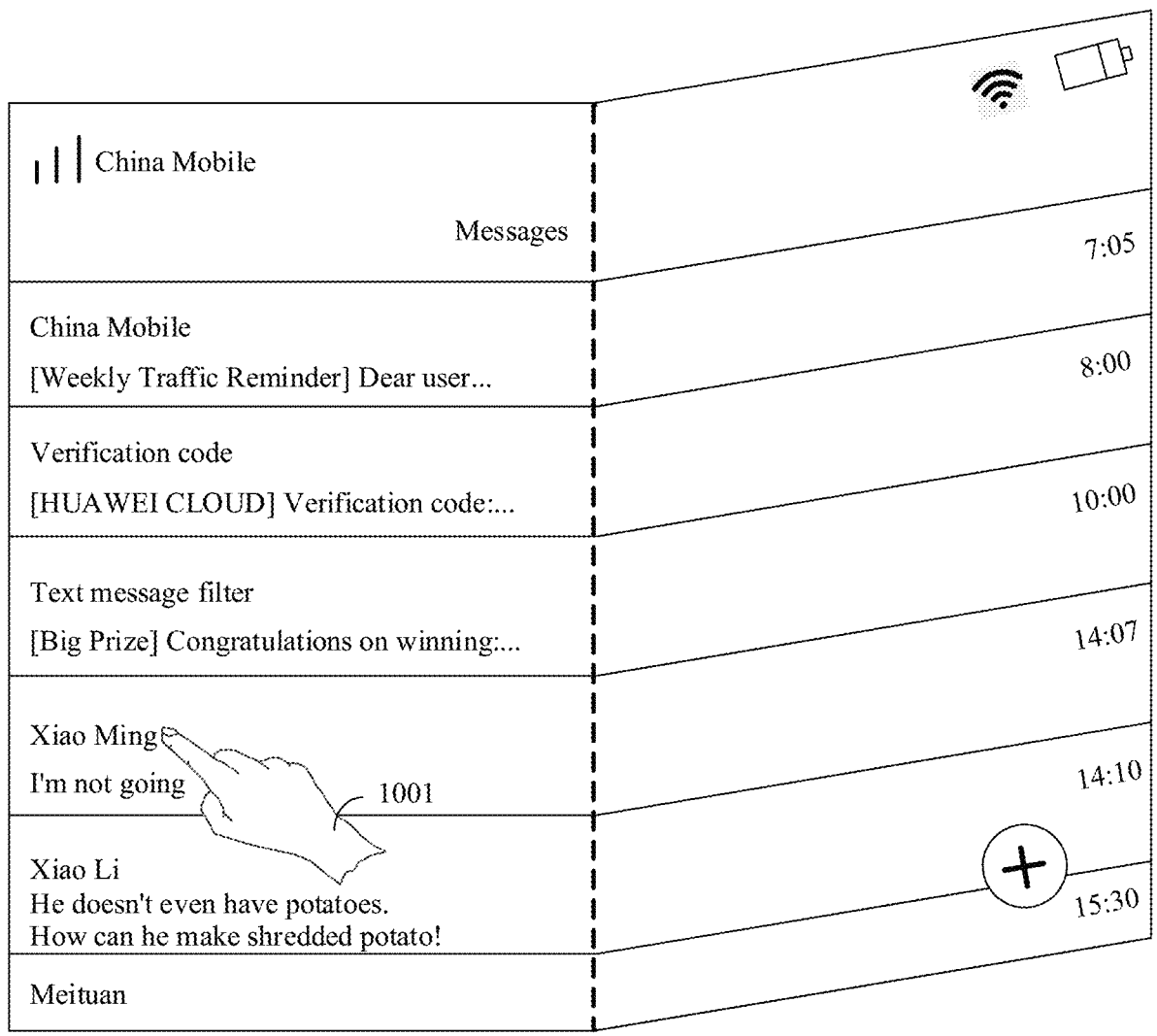
FIG. 10 is a schematic diagram 2 of an interface of a terminal device according to an embodiment of this application.
Figure 11:
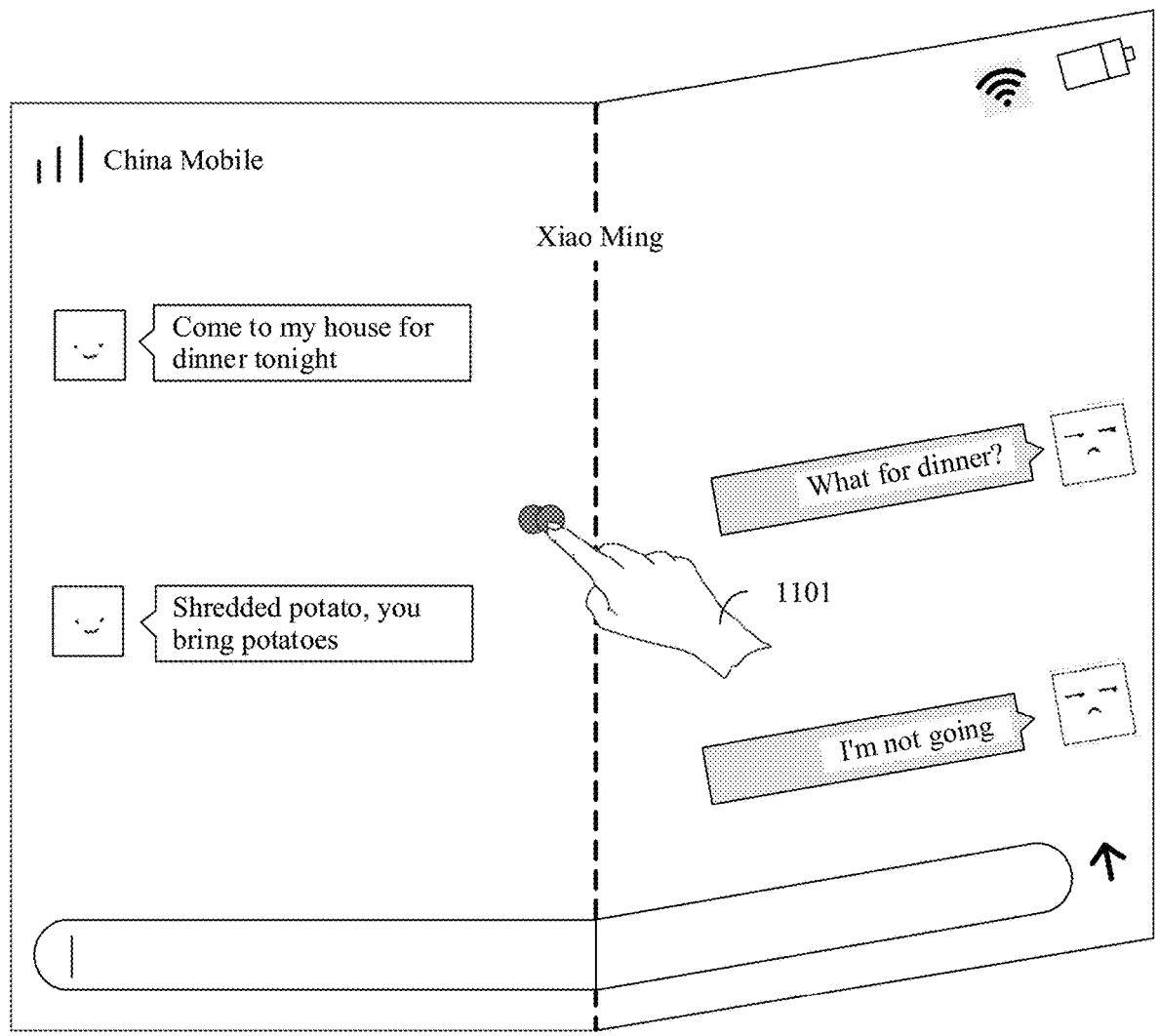
FIG. 11 is a schematic diagram 3 of an interface of a terminal device according to an embodiment of this application.
Figure 12:
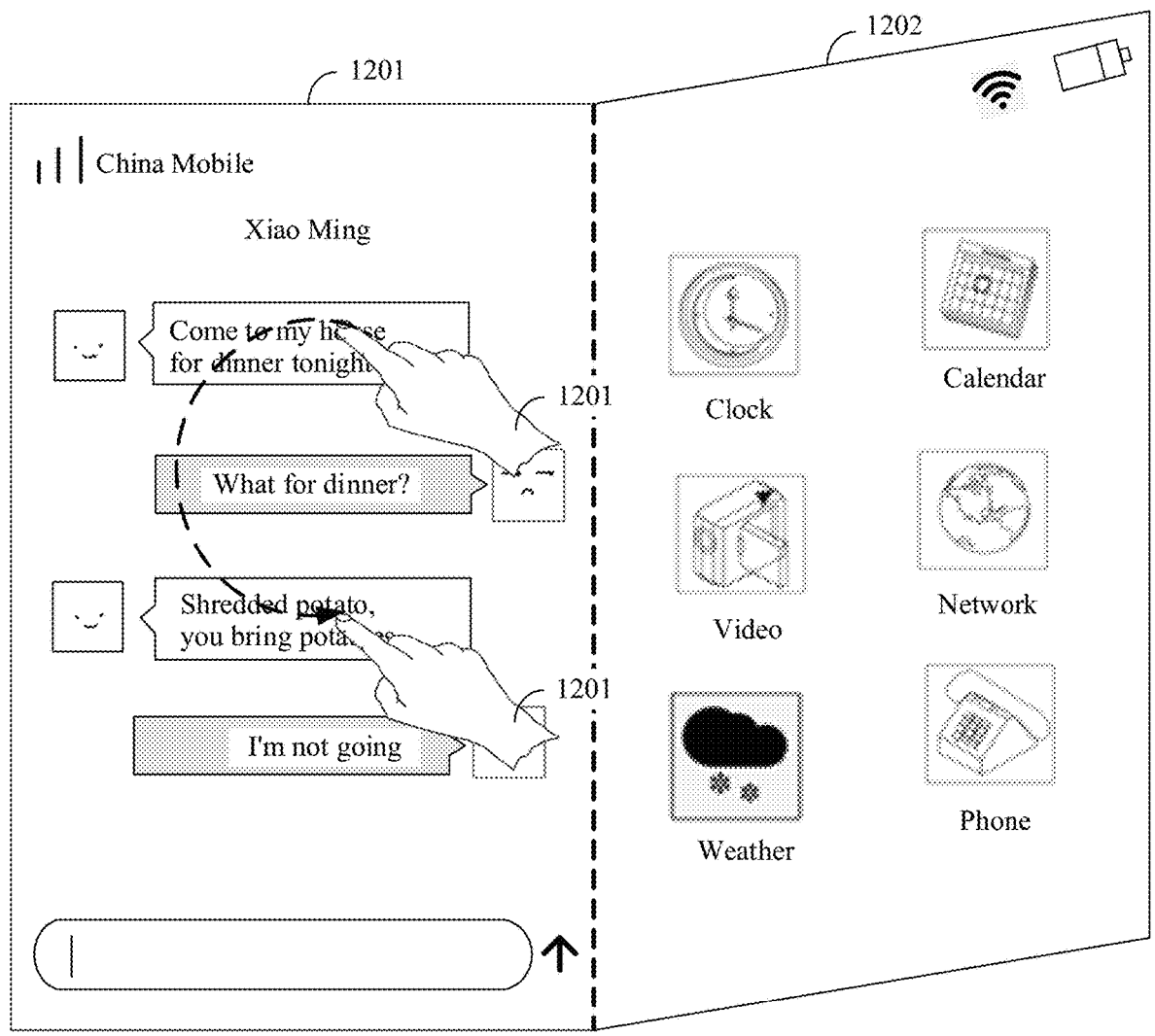
FIG. 12 is a schematic diagram 4 of an interface of a terminal device according to an embodiment of this application.
Figure 13:
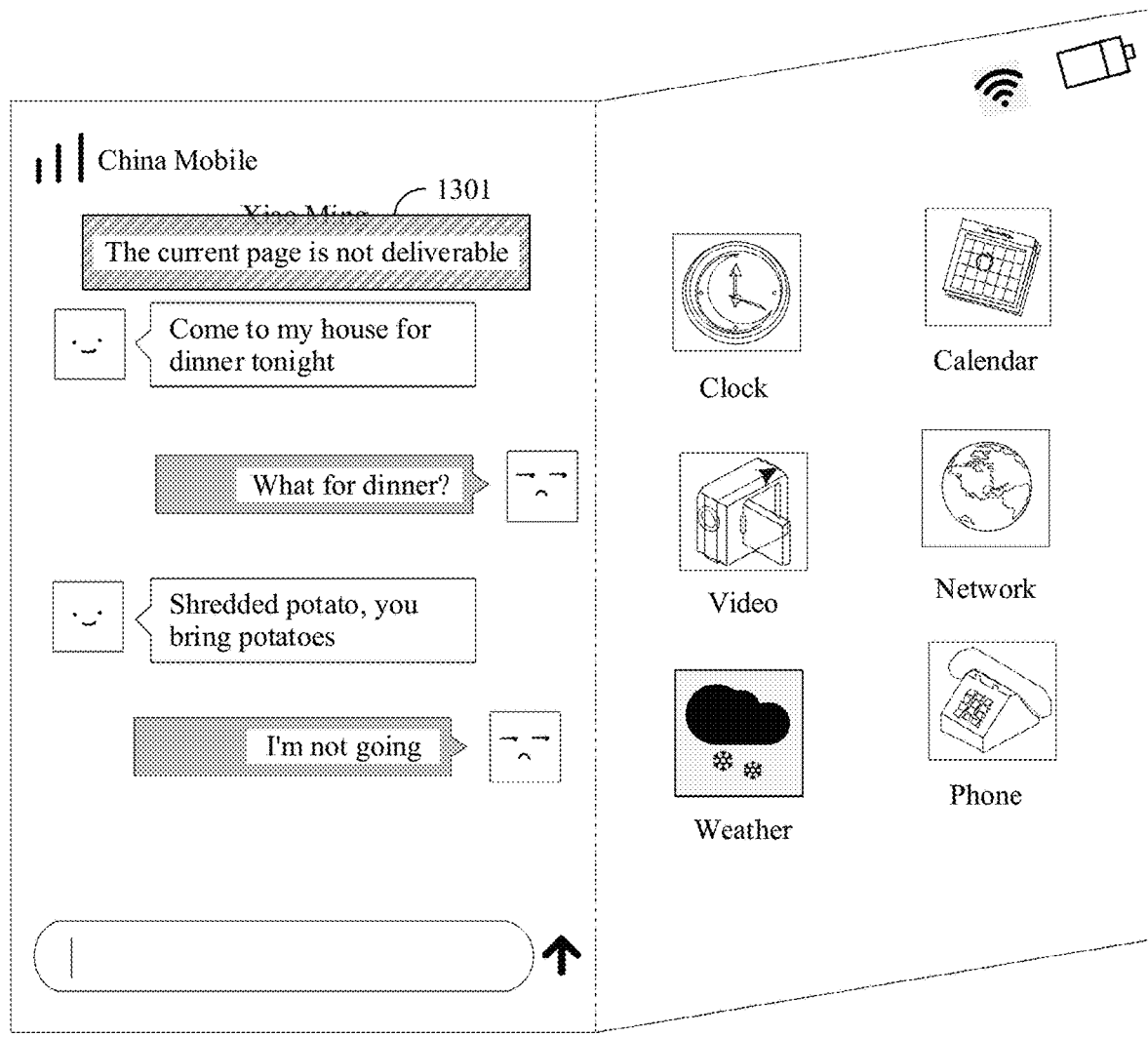
FIG. 13 is a schematic diagram 5 of an interface of a terminal device according to an embodiment of this application.
Figure 14:
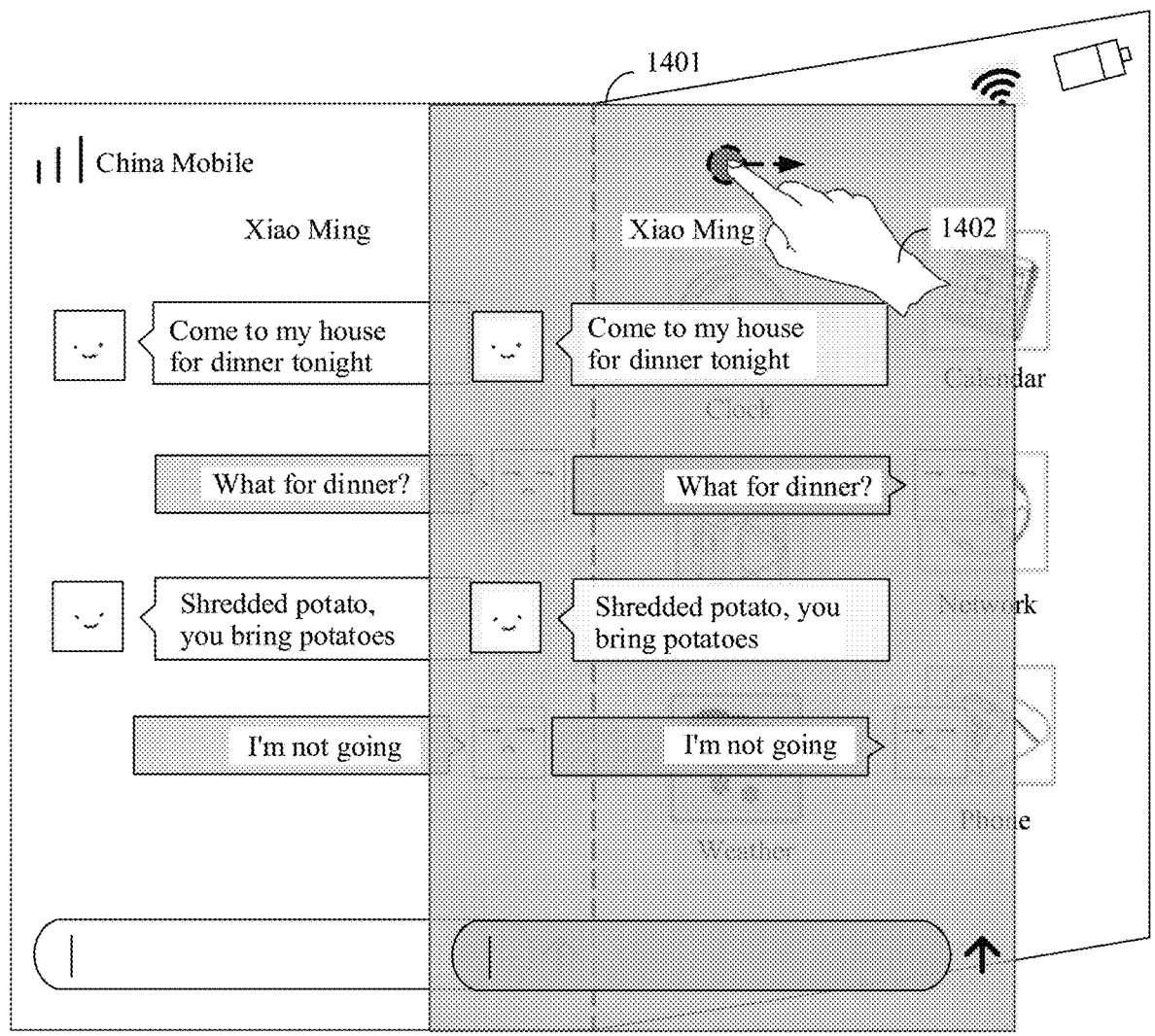
FIG. 14 is a schematic diagram 6 of an interface of a terminal device according to an embodiment of this application.
Figure 15:
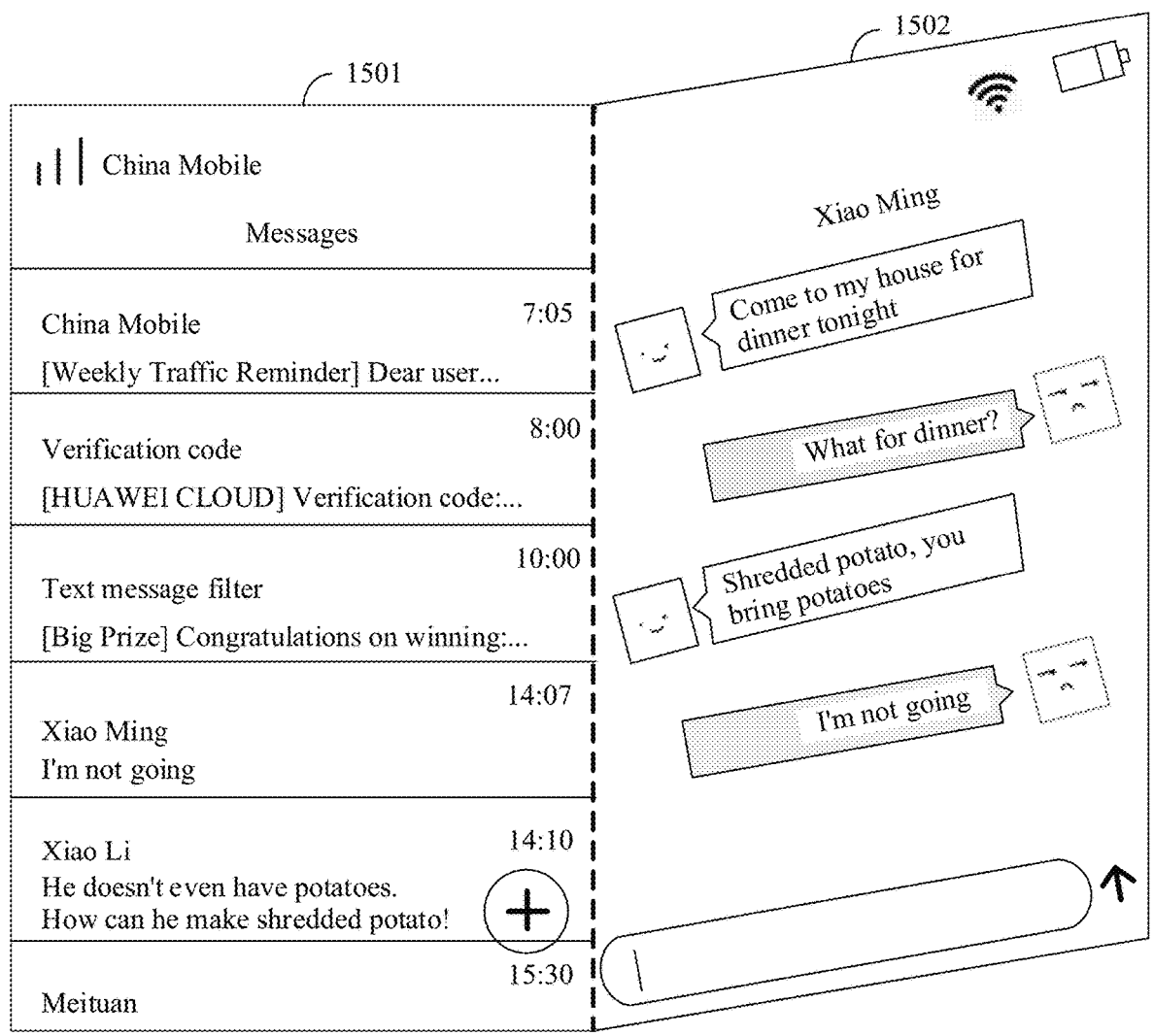
FIG. 15 is a schematic diagram 7 of an interface of a terminal device according to an embodiment of this application.
Figure 16:
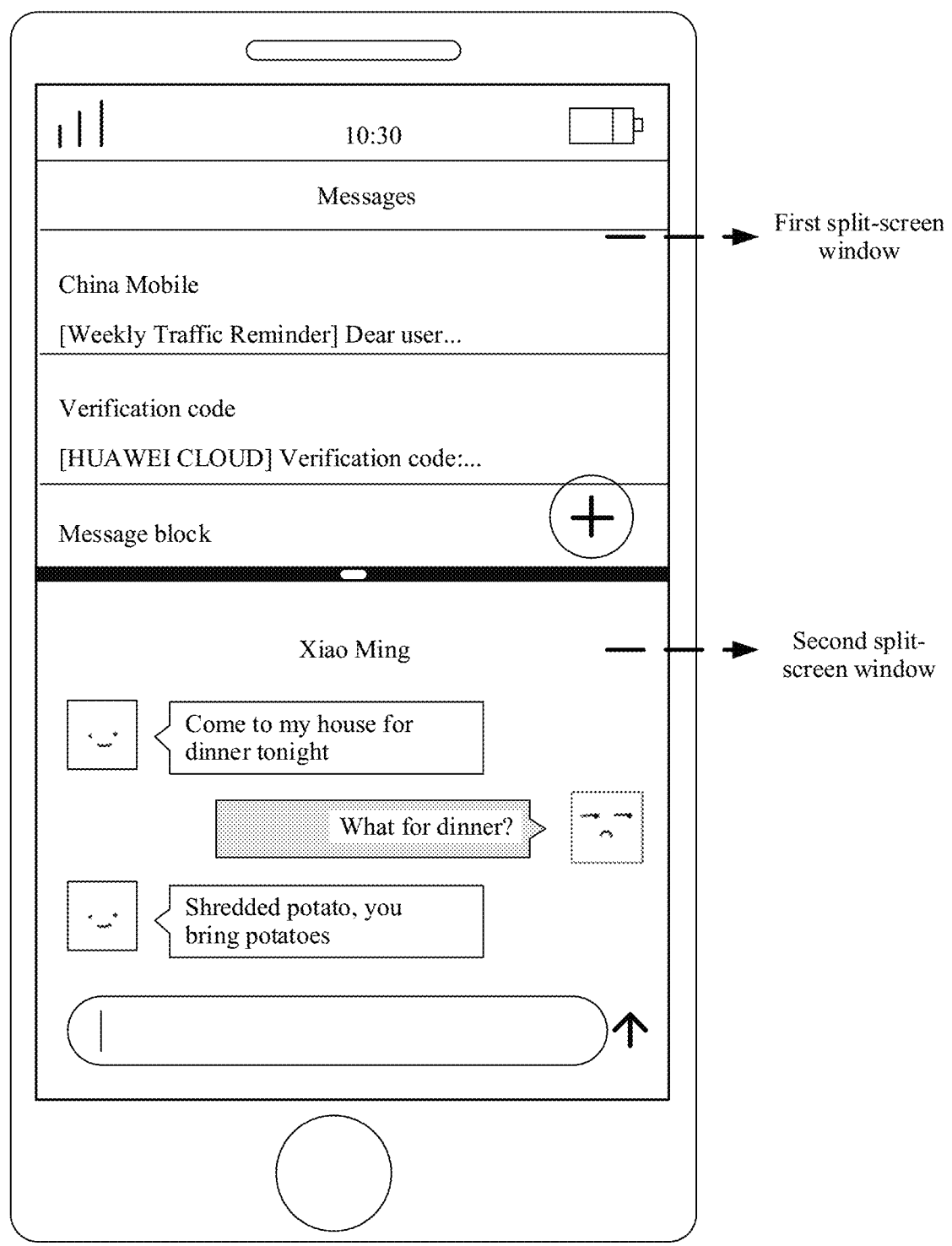
FIG. 16 is a schematic diagram 8 of an interface of a terminal device according to an embodiment of this application.

Based on the foregoing embodiments, the following further describes in detail the terminal control method provided in embodiments of this application. FIG. 8 is a flowchart 2 of a terminal control method according to another embodiment of this application. FIG. 9 is a schematic diagram 1 of an interface of a terminal device according to an embodiment of this application. FIG. 10 is a schematic diagram 2 of an interface of a terminal device according to an embodiment of this application. FIG. 11 is a schematic diagram 3 of an interface of a terminal device according to an embodiment of this application. FIG. 12 is a schematic diagram 4 of an interface of a terminal device according to an embodiment of this application. FIG. 13 is a schematic diagram 5 of an interface of a terminal device according to an embodiment of this application. FIG. 14 is a schematic diagram 6 of an interface of a terminal device according to an embodiment of this application. FIG. 15 is a schematic diagram 7 of an interface of a terminal device according to an embodiment of this application. FIG. 16 is a schematic diagram 8 of an interface of a terminal device according to an embodiment of this application.

As shown in FIG. 8, the method includes the following operations.

S801: In response to a first operation performed on a terminal device, control a screen of the terminal device to display at least two split-screen windows, where the at least two split-screen windows include a first split-screen window and a second split-screen window, and the first split-screen window is used to display a first page of a first application.

An example in which the first operation is a double-tap operation and the first application is a Messages application is used below to describe embodiments of the first operation and the at least two split-screen windows with reference to FIG. 9 to FIG. 12.

Refer to FIG. 9. It is assumed that a current screen of a terminal device is a foldable display, and the screen of the terminal device includes a plurality of applications, for example, Clock and Calendar shown in FIG. 9. To open different operation pages of a same application on the screen of the terminal device at a same moment, the application needs to be opened first. If a current user wants to open an application "Messages", that is, the first application is the Messages application, in response to a tap operation performed on a Messages application icon, the terminal device displays an interface of the Messages application on the screen.

It is assumed that a main interface of the Messages application is currently displayed. As shown in FIG. 10, a plurality of messages are displayed on the main interface of the Messages application. If the user currently opens the message of "Xiao Ming", a chat content page of the Messages application may be displayed on the screen of the terminal device.

As shown in FIG. 11, detailed content of a chat with Xiao Ming is displayed on the chat content page of the Messages application. If the user wants to perform multi-window display of the Messages application on the current chat content page, the user may perform the first operation, and it is assumed that the first operation is the double-tap operation.

Then, in response to a first operation 1101 performed on the terminal device, the screen of the terminal device is controlled to display the at least two split-screen windows, where the at least two split-screen windows include the first split-screen window and the second split-screen window. In some embodiments, for the first split-screen window and the split-screen window, refer to an example in FIG. 12. Refer to FIG. 12. A first split-screen window 1201 and a second split-screen window 1202 are displayed on the screen of the terminal device, and the first split-screen window 1201 displays the first page of the first application. In the current example, the first page is the chat content page of the Messages application.

In addition, an icon of an application that can be displayed in a split-screen mode may be displayed in the second split-screen window, or a home screen may be displayed in the second split-screen window. Content displayed in the second split-screen window is not limited in this embodiment, and may be selected based on an actual requirement.

It may be understood that the first split-screen window, the second split-screen window, and embodiments of the first page shown in FIG. 12 are merely examples. Locations of the first split-screen window and the second split-screen window may be set based on an actual requirement. The first page may a page on which the user wants to perform multi-window display on the first application, and depends on a page on which the user performs an operation.

S802: In response to a second operation performed on the first split-screen window, determine whether the first page meets a preset condition; and if yes, perform S803, or if no, perform S804.

Then, the terminal device needs to display the pages of the first application in both the first split-screen window and the second split-screen window. In this case, an operation is required to set the first page to a deliverable state, and the page may be set to the deliverable state by using the second operation. The deliverable state means that a current page can be displayed in another window.

In some embodiments, the second operation may be a preset gesture operation. For example, the preset gesture operation may be set in "Settings-Smart Assistance-Gesture Control-Letter Gesture" on the terminal device. The preset gesture operation may be a track of sliding letters such as c, e, m, and w by using a knuckle or a finger. Alternatively, the second operation may be any possible operation such as a slide operation, a touch-and-hold operation, a voice operation, or a physical button operation, provided that the second operation is used to set the first page to the deliverable state.

It is assumed that the second operation is a track of sliding a letter c by using a finger. For example, refer to FIG. 12. The first page is set to the deliverable state in response to a second operation 1201 performed on the first split-screen window.

It may be understood that some pages are deliverable, but some pages are not deliverable. Therefore, whether the first page meets the preset condition is determined before the first page is set to the deliverable state.

In some embodiments, a preset page list may be determined for each application. For example, a preset page list for the first application includes a page that is deliverable in the first application. Assuming that the first application has 12 pages in total, the first to the eighth pages are deliverable, and the ninth to the twelfth pages are not deliverable, the preset page list includes eight deliverable pages.

The determining whether the first page meets the preset condition may be: determining whether the preset page list includes the first page; and if the preset page list includes the first page, determining that the first page meets the preset condition; or if the preset page list does not include the first page, determining that the first page does not meet the preset condition.

The preset page may be understood as a trustlist. In some embodiments, a blacklist may be determined for each application, and the blocklist includes pages that are not deliverable in a current application.

In some embodiments, a query may be performed in the database, to directly determine whether the first page is deliverable. In some embodiments, determining whether the first page meets the preset condition may be selected based on an actual requirement.

S803: Obtain a screenshot of the first page, and process the screenshot of the first page to obtain a first floating window.

In a possible case, if the first page meets the preset condition, it indicates that the first page is deliverable, and the first page may be set to the preset state.

In some embodiments, setting the first page to the preset state may be: obtaining the screenshot of the first page, and processing the screenshot of the first page to obtain the first floating window, where the first floating window may be, for example, in a translucent state, so that the user determines that the current page is deliverable.

In some embodiments, setting the first page to the preset state may be: displaying a prompt question on the first page, for example, displaying words such as "The current page is deliverable". In some embodiments, a preset identifier may be displayed on the first page, for example, a graph in a preset color may be displayed.

S804: Display prompt information on the first page, where the prompt information is used to indicate that the first page is not deliverable.

In another possible case, if the first page does not meet the preset condition, it indicates that the first page is not deliverable, that is, the first page cannot be displayed in another window in response to an operation of the user. In this case, the user needs to be notified that the first page is not deliverable, and prompt information may be displayed on the first page. For example, refer to FIG. 13. Prompt information 1301 indicating that "The current page is not deliverable" is displayed on the first page. In some embodiments, the prompt information may be selected based on an actual requirement, provided that the prompt information can indicate that the first page is not deliverable.

In some embodiments, for example, the first page may be set to a preset color, or a preset identifier may be set on the first page. This is not limited in this embodiment, provided that the user can be notified that the current first page is not deliverable.

S805: In response to a third operation performed on the first page, move the first floating window to the second split-screen window.

When the first page is deliverable, it indicates that the first page can be transformed from the first split-screen window to another split-screen window for display.

In this embodiment of this application, the first floating window is draggable. This can effectively implement a dynamic effect of page movement.

Refer to FIG. 14. FIG. 14 provides an example of an embodiment of a first floating window 1401. In some embodiments, for example, the third operation may be a moving operation, and the first floating window may be moved to the second split-screen window in response to a third operation 1402. An effect of dynamically moving a page can be implemented by setting and moving the first floating window. This can improve operation experience and visual experience of the user.

S806: Display the first page in the second split-screen window based on the first floating window.

In a process of displaying the first page in the second split-screen window based on the first floating window, it may be understood that when moving the first floating window, the user may only move the first floating window into a region of the second split-screen window, but does not absolutely align the first floating window with the second split-screen window.

Therefore, to improve operation efficiency and convenience of the user, in some embodiments, when the third operation ends (which may be understood as that no touch operation is detected), a moving position of the first floating window may be determined, and whether an overlap ratio between the first floating window and the second split-screen window is greater than or equal to a preset threshold is determined based on the moving position of the first floating window. If the consistency is greater than or equal to the preset threshold, it can be determined that the user is to deliver the first page to the second split-screen window, and the first page is displayed in the second split-screen window.

If the overlap ratio is less than the preset threshold, to avoid a mis-operation of the user, it can be determined that the user currently does not deliver the first page to the second split-screen window, and the first page may be displayed in the first split-screen window. In this case, content displayed on the screen of the terminal device does not change.

For example, the preset threshold may be 70%. When the overlap ratio is greater than 70%, the first page is displayed in the second split-screen window. A setting of the preset threshold may be selected based on an actual requirement, which is not limited in this embodiment.

In some embodiments, the overlap ratio may be determined based on a ratio of an area of an intersection region of the first floating window and the second split-screen window to an area of the first floating window or to an area of the second split-screen window. Alternatively, the overlap ratio may be determined based on distances between coordinates of four corners of the first floating window and coordinates of four corners of the second split-screen window.

S807: Display a second page of the first application in the first split-screen window, where the second page is a previous page of the first page.

When the first page is displayed in the second split-screen window, to display a plurality of pages of the first application at a same moment, the second page of the first application needs to be further displayed in the first split-screen window. The second page is the previous page of the first application. An example in this embodiment is used for description. Refer to FIG. 10 and FIG. 11. It may be determined that a previous page of a chat content page is a home page of the Messages application. For example, refer to FIG. 15. The second page (the home page) is displayed in a first split-screen window 1501, and the first page (a chat content page) is displayed in a second split-screen window 1502.

In some embodiments, different pages of a same application are effectively displayed at a same moment. In addition, in this embodiment of this application, a page on which multi-window display of the first application is triggered depends on an operation of the user. Therefore, multi-window display of a current application can be effectively implemented on a page.

It should be noted that FIG. 9 to FIG. 15 are all described by using an example in which the terminal device includes a foldable display. However, in some embodiments, regardless of whether the terminal device is a foldable display, the solution of this application can be implemented. For example, when the terminal device includes a non-foldable display, a final display effect may be shown in FIG. 16. An embodiment is similar to that of the foldable display, and details are not described herein again. The foregoing embodiments are described by using a terminal device with a foldable display. This is only because a screen of the foldable display is relatively large and is easy to describe, and is not intended to indicate that the embodiment can be implemented only on the terminal device with the foldable display.

In addition, it should be further noted that, in the embodiments described in FIG. 9 to FIG. 15, it is assumed that the user starts to trigger multi-window display on the chat content page, where the chat content page has a previous page, that is, a home page of the Messages application. In some embodiments, if the current application opens only the first page, for example, the user triggers multi-window display on the home page of the Messages application, a page finally displayed in the first split-screen window may be, for example, a home screen, or may be a page of another application, and may be selected based on an actual requirement. This is not limited in this embodiment.

The terminal control method provided in this embodiment of this application includes: in response to the first operation performed on the terminal device, controlling the screen of the terminal device to display the at least two split-screen windows, where the at least two split-screen windows include the first split-screen window and the second split-screen window, and the first split-screen window is used to display the first page of the first application; in response to the second operation performed on the first split-screen window, determining whether the first page meets the preset condition; if yes, obtaining the screenshot of the first page, and processing the screenshot of the first page to obtain the first floating window; if no, displaying prompt information on the first page, where the prompt information is used to indicate that the first page is not deliverable; in response to the third operation performed on the first page, moving the first floating window to the second split-screen window; displaying the first page in the second split-screen window based on the first floating window; and displaying the second page of the first application in the first split-screen window, where the second page is a previous page of the first page. In response to an operation of the user, a plurality of pages of the first application are displayed on the screen of the terminal device at a same moment, so as to effectively trigger multi-window display. In addition, in this embodiment, a dynamic movement effect of the first page can be effectively implemented by setting and moving the first floating window, to improve operation experience and visual experience of the user.

Figure 17:
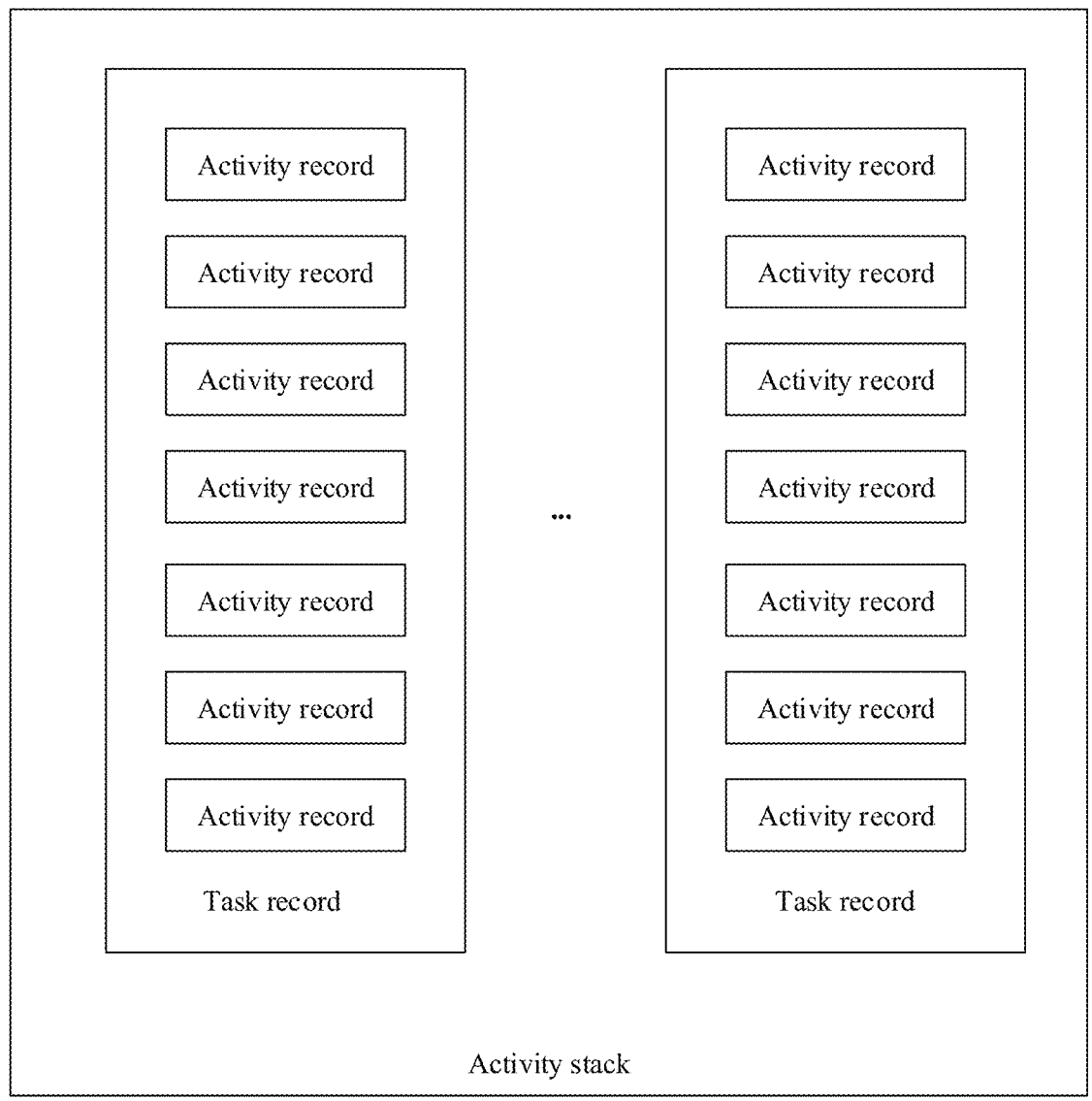
FIG. 17 is a schematic diagram of an activity stack according to an embodiment of this application.

In some embodiments, page management uses an activity stack. The following first describes the activity stack with reference to FIG. 17. FIG. 17 is a schematic diagram of an activity stack according to an embodiment of this application.

Refer to FIG. 17:

An activity record is a class used to record activity information, and mainly records all information about an activity. One activity record corresponds to one activity, but one activity can have a plurality of instances in the system. Therefore, one activity can correspond to a plurality of activity records.

A task record consists of one or more records. The task record features last-in first-out and is used to record information about an invoked activity in a task.

The activity stack is used to manage task records. An activity stack contains a plurality of task records.

Figure 18:
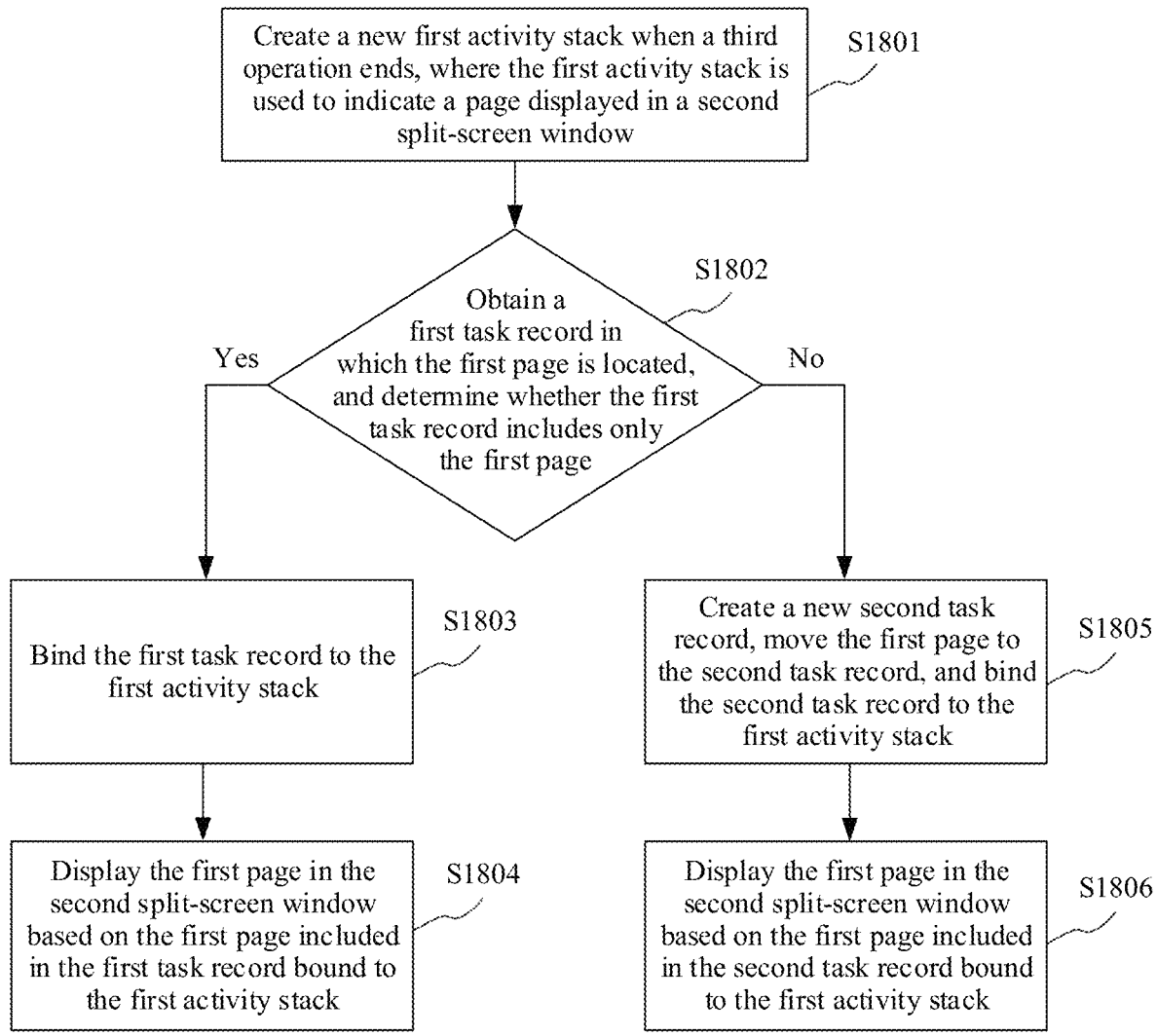
FIG. 18 is a flowchart 3 of a terminal control method according to still another embodiment of this application.
Figure 19:
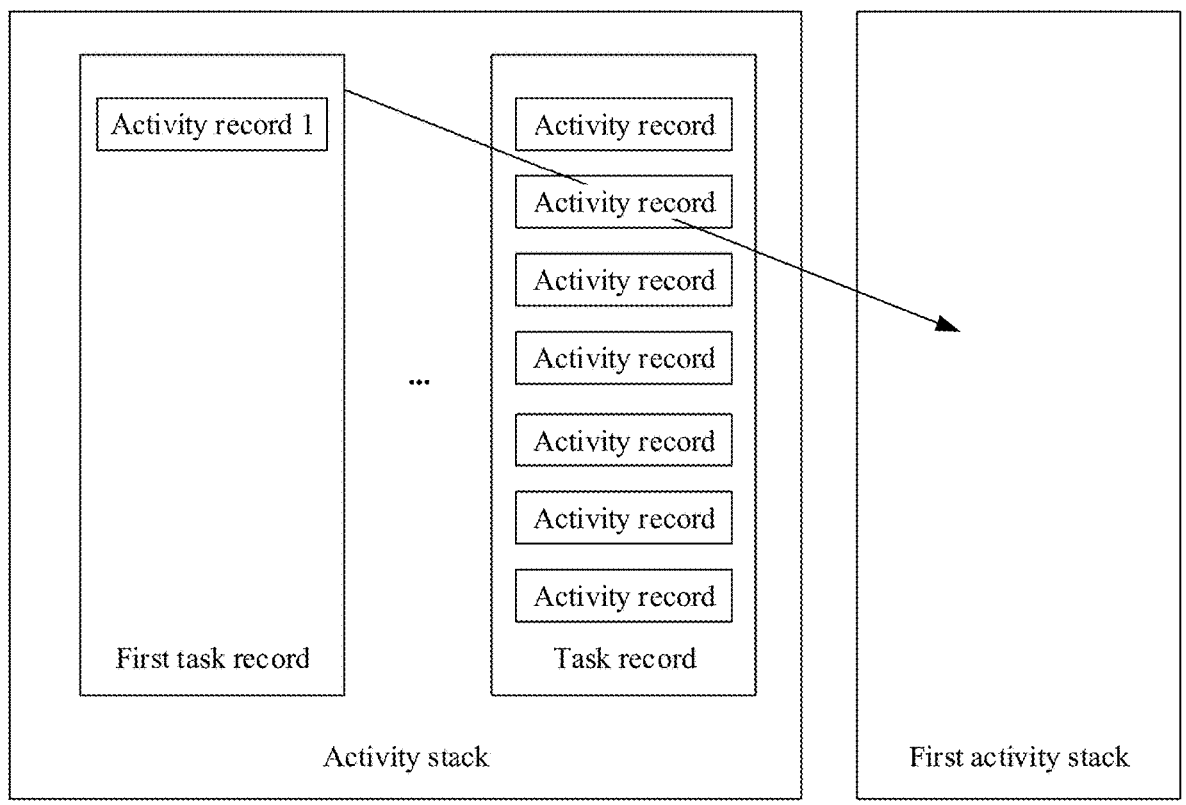
FIG. 19 is a schematic diagram of reparenting according to an embodiment of this application.
Figure 20:
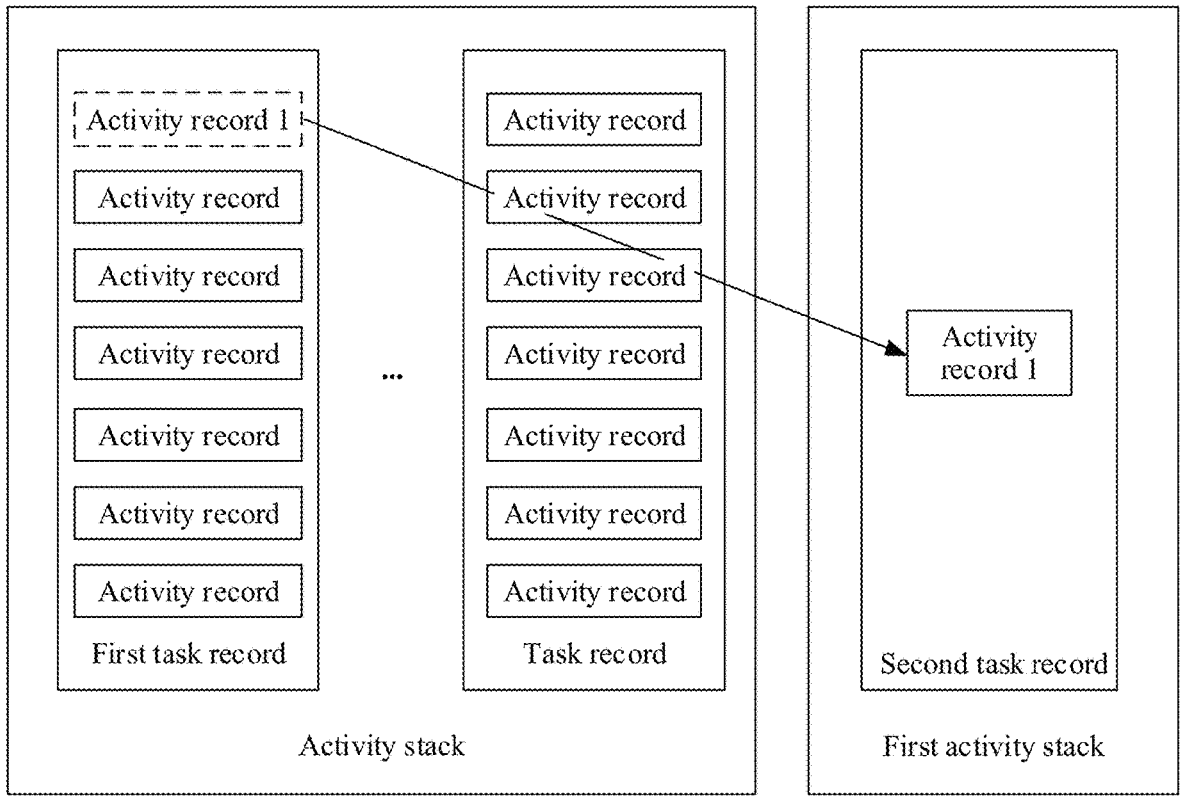
FIG. 20 is a schematic diagram of creating a second task record according to an embodiment of this application.

Description is provided with reference to FIG. 18 to FIG. 20. FIG. 18 is a flowchart 3 of a terminal control method according to another embodiment of this application. FIG. 19 is a schematic diagram of reparenting according to an embodiment of this application. FIG. 20 is a schematic diagram of creating a second task record according to an embodiment of this application.

As shown in FIG. 18, the method includes the following operations.

S1801: Create a new first activity stack when a third operation ends, where the first activity stack is used to indicate a page displayed in a second split-screen window.

In this embodiment, when the third operation ends, it may be determined that a user actually wants to display the first page in the second split-screen window. In this case, the first activity stack is created. The first activity stack is used to indicate a page displayed in the second split-screen window. In some embodiments, if the first activity stack includes an activity record, the second split-screen window displays a page corresponding to the activity record.

It should be noted that, in the picture-in-picture mode in the conventional technology, when different operation pages of an application are displayed at a same moment, mPinnedStack natively maintained by Android is used. However, in this application, the new first activity stack is created to indicate the page displayed in the second split-screen window. In a page management and maintenance process, creating the new first activity stack can effectively improve operation flexibility.

S1802: Obtain a first task record in which the first page is located, and determine whether the first task record includes only the first page; and if yes, perform S1803, or if no, perform S1805.

The first task record in which the first page is located is obtained. In some embodiments, one activity record corresponds to one page, and the first task record in which the first page is located may be obtained by obtaining an activity record corresponding to the first page.

S1803: Bind the first task record to the first activity stack.

In some embodiments, if the first task record includes only the first page, the first task record may be directly bound to the first activity stack. For example, the first task record may be reparented to the first activity stack. For an embodiment, refer to FIG. 19. It can be learned from FIG. 19 that the current first task record includes only an activity record 1. It is assumed that the activity record 1 corresponds to the first page, the first task record includes only the first page. In this case, the first task record is bound to the first activity stack, and a page included in the first activity stack is the first page.

S1804: Display the first page in the second split-screen window based on the first page included in the first task record bound to the first activity stack.

In this embodiment of this application, the first activity stack is used to indicate a page displayed in the second split-screen window. Refer to FIG. 19. It may be determined that a page corresponding to the current first activity stack is the first page, so that the first page can be displayed in the second split-screen window.

When the first task record includes only the first page, the existing first task record is directly bound to the first activity stack, so that there is no need to create another activity stack. This can effectively reduce system memory overheads.

S1805: Create a new second task record, move the first page to the second task record, and bind the second task record to the first activity stack.

In some embodiments, if the first task record further includes another page in addition to the first page, for example, refer to FIG. 20. The first task record further includes many other activity records in addition to the activity record 1. Therefore, the first activity stack cannot be directly bound to the first task record. In this case, another second task record needs to be created.

Refer to FIG. 20. After the new second task record is created, the activity record 1 corresponding to the first page may be moved from the first task record to the second task record, and the second task record is bound to the first activity stack.

S1806: Display the first page in the second split-screen window based on the first page included in the first task record bound to the second activity stack.

In this case, the first activity stack corresponds to the second task record, and the second task record includes the first page. The second split-screen window is displayed based on the first activity stack, so that the first page can be displayed in the second split-screen window.

In this embodiment of this application, an activity record of the second page in the first task record is adjacent to the activity record of the first page in the first task record. For example, refer to FIG. 20. The activity record corresponding to the second page may be an activity record below the activity record 1 corresponding to the first page. After the activity record 1 is moved to the second task record, a first split-screen window automatically displays a page corresponding to the activity record below the activity record 1.

In some embodiments, if only the activity record 1 exists in the first activity stack, after the activity record 1 is moved to the second task record, the first task record includes no activity record. In this case, for example, a home screen may be displayed in the first split-screen window.

The terminal control method provided in this embodiment of this application includes: creating the new first activity stack when the third operation ends, where the first activity stack is used to indicate a page displayed in the second split-screen window; obtaining the first task record in which the first page is located, determining whether the first task record includes only the first page; if yes, binding the first task record to the first activity stack; displaying the first page in the second split-screen window based on the first page included in the first task record bound to the first activity stack; if no, creating the new second task record, moving the first page to the second task record, and binding the second task record to the first activity stack; and displaying the first page in the second split-screen window based on the first page included in the second task record bound to the first activity stack. The page displayed in the second split-screen window is managed by creating the first activity stack, so that page management can be flexibly and efficiently implemented. In addition, when the first task record includes only the first page, the existing first task record can be directly bound to the first activity stack, so that there is no need to create another activity stack. This can effectively reduce system memory overheads.

Based on the foregoing embodiment, the following compares a multi-window display method for an application provided in this application and a display method in a picture-in-picture mode in the conventional technology.

1. Triggering Mode

The technical solution in this application is actively and selectively triggered by the user, but the picture-in-picture mode in the conventional technology is triggered from an activity by using system logic.

Therefore, compared with the picture-in-picture mode in the conventional technology, in this application, multi-window display can be triggered for a page that the user wants to display in multi-window mode.

2. Activity that Needs to be Changed

In this application, when an activity (e.g., page) that needs to be changed is searched for, an activity at an uppermost layer of a focus page is directly queried. However, in the picture-in-picture mode of the conventional technology, a page token needs to be transferred in the activity, and then the activity that needs to enter the picture-in-picture mode is found based on the page token.

Therefore, compared with the picture-in-picture mode in the conventional technology, in this application, a page that needs to be displayed in multi-window mode can be quickly and efficiently found.

3. Activity Stack that Carries Pages

In this application, a new first activity stack is created to indicate a page displayed in the second split-screen window. However, in the picture-in-picture mode in the conventional technology, when different operation pages of an application are displayed at the same time, an mPinnedStack natively maintained by Android is used.

Therefore, compared with the picture-in-picture mode in the conventional technology, in this application, operation flexibility can be effectively improved in a page management and maintenance process.

4. Verify Whether the Page is Deliverable

In this application, whether a page is deliverable may be determined by maintaining a preset page list, and the picture-in-picture mode in the conventional technology uses a verification performed by determining whether parameters android: supportsPictureInPicture and android: resizeableActivity are true.

Therefore, compared with the picture-in-picture mode in the conventional technology, this application can simply and efficiently verify whether a page is deliverable. This effectively improves operation efficiency.

In conclusion, according to the terminal control method provided in this application, in a multi-window mode, display region location information of a second split-screen window obtained after a user actively delivers a page can be obtained, a new first activity stack is created for the delivered first page, and a display region of the new first activity stack is specified as a target region location of the second split-screen window, so as to display different pages of a same application in different windows.

Figure 21:
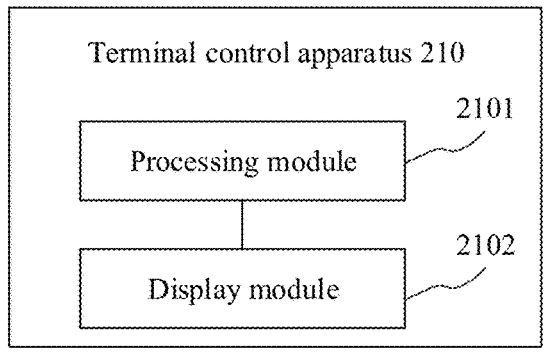
FIG. 21 is a schematic diagram of a structure of a terminal control apparatus according to an embodiment of this application.

FIG. 21 is a schematic diagram of a structure of a terminal control apparatus according to an embodiment of this application. As shown in FIG. 21, the apparatus 210 includes a processing module 2101 and a display module 2102.

The processing module 2101 is configured to: in response to a first operation performed on the terminal device, control the screen of the terminal device to display at least two split-screen windows, where the at least two split-screen windows include a first split-screen window and a second split-screen window, and the first split-screen window is used to display a first page of a first application.

The processing module 2101 is further configured to set the first page to a preset state in response to a second operation performed on the first split-screen window.

The display module 2102 is configured to display the first page in the second split-screen window and display a second page of the first application in the first split-screen window in response to a third operation performed on the first page, where the second page is a previous page of the first page.

In some embodiments, the processing module 2101 is configured to:
  in response to the second operation performed on the first split-screen window, determine whether the first page meets a preset condition; and
  if yes, set the first page to the preset state.

In some embodiments, the processing module 2101 is further configured to:
  before setting the first page to the preset state in response to the second operation performed on the first split-screen window, determine a preset page list, where the preset page list includes a page that is deliverable in the first application.

The preset condition is that the preset page list includes the first page.

In some embodiments, the processing module 2101 is configured to:
  obtain a screenshot of the first page, and process the screenshot of the first page to obtain a first floating window.

In some embodiments, the display module 2102 is configured to:
  in response to the third operation performed on the first page, move the first floating window to the second split-screen window; and display the first page in the second split-screen window based on the first floating window.

In some embodiments, the display module 2102 is configured to:
  determine whether an overlap ratio between the first floating window and the second split-screen window is greater than or equal to a preset threshold; and if yes, display the first page in the second split-screen window.

In some embodiments, the display module 2102 is configured to:
  create a new first activity stack when the third operation ends, where the first activity stack is used to indicate a page displayed in the second split-screen window; and display the first page in the second split-screen window based on the first activity stack.

In some embodiments, the display module 2102 is configured to:
  obtain a first task record in which the first page is located, and determine whether the first task record includes only the first page;
  if yes, bind the first task record to the first activity stack; and display the first page in the second split-screen window based on the first page included in the first task record bound to the first activity stack.

In some embodiments, the processing module 2101 is further configured to:
  if the first task record does not include only the first page, create a new second task record, move the first page to the second task record, and bind the second task record to the first activity stack; and
  display the first page in the second split-screen window based on the first page included in the second task record bound to the first activity stack.

In some embodiments, in the first task record, the second page is a page adjacent to the first page.

In some embodiments, the first operation is an operation for triggering a split-screen mode, the second operation is a preset gesture operation, and the third operation is a sliding operation.

The apparatus provided in this embodiment may be configured to execute the technical solutions in the foregoing method embodiments, implementation principles and technical effects thereof are similar, and details are no longer described herein in this embodiment.

Some embodiments provide a computer-readable storage medium. The computer-readable storage medium stores computer-executable instructions. When executing the computer-executable instructions, a processor implements the foregoing terminal control method performed by a terminal device.

In some embodiments, it should be understood that the disclosed device and method may be implemented in other manners. For example, the described device embodiment is merely an example. For example, division into the modules is merely logical function division and may be other division in some embodiments. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) or a processor to perform some of the operations of the methods described in embodiments of this application.

It should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The operations of the methods disclosed with reference to the present disclosure may be directly implemented by a hardware processor, or may be implemented by a combination of hardware and a software module in a processor.

The memory may include a high-speed RAM memory, or may include a non-volatile memory NVM such as at least one magnetic disk memory, or may include a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. Buses may be classified into an address bus, a data bus, a control bus, and the like. For ease of representation, the bus in the accompanying drawings of this application is not limited to only one bus or only one type of bus.

The storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose or a special-purpose computer.

Persons of ordinary skill in the art may understand that all or some of the operations of the method embodiments may be implemented by a program instructing related hardware. The program may be stored in a computer-readable storage medium. When the program is run, the operations of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of the present disclosure.

What is claimed is:

1. A method comprising:
   in response to a first operation performed on a terminal device, controlling a screen of the terminal device to display at least two split-screen windows comprising a first split-screen window and a second split-screen window, wherein the first split-screen window displays a first page of a first application;
   while displaying the first-split-screen window and the second split-screen window on the screen, setting the first page that is displayed on the first split-screen window to a preset state in response to a second operation performed on the first split-screen window, the preset state indicating that the first page is deliverable; and
   displaying the first page, in entirety, in the second split-screen window and displaying a second page of the first application in the first split-screen window in response to a third operation performed on the first page, wherein the second page is a previous page of the first page.

2. The method according to claim 1, wherein the setting the first page to the preset state further comprises:
   in response to the second operation performed on the first split-screen window, determining whether the first page meets a preset condition; and
   setting the first page to the preset state in response to determining that the first page meets the preset condition.

3. The method according to claim 2, wherein, prior to the setting the first page to the preset state, the method further comprises:
   determining a preset page list, wherein the preset page list comprises a page that is deliverable in the first application, and wherein the preset condition is that the preset page list comprises the first page.

4. The method according to claim 2, further comprising:
   obtaining a screenshot of the first page;
   processing the screenshot of the first page to obtain a first floating window, wherein the first floating window captures the first page in entirety;
   in response to the third operation performed on the first page, moving the first floating window to the second split-screen window; and
   displaying the first page in entirety in the second split-screen window based on the first floating window.

5. The method according to claim 4, wherein the displaying the first page in the second split-screen window based on the first floating window further comprises:
   determining whether an overlap ratio between the first floating window and the second split-screen window is greater than or equal to a preset threshold; and
   displaying the first page in the second split-screen window in response to determining that the overlap ratio between the first floating window and the second split-screen window is greater than or equal to the preset threshold.

6. The method according to claim 1, wherein the displaying the first page in the second split-screen window further comprises:
   creating an activity stack when the third operation ends, wherein the activity stack is used to indicate a page displayed in the second split-screen window; and
   displaying the first page in the second split-screen window based on the activity stack.

7. The method according to claim 6, wherein the displaying the first page in the second split-screen window based on the activity stack further comprises:
   obtaining a first task record in which the first page is located;
   determining whether the first task record comprises only the first page;
   binding the first task record to the activity stack in response to determining that the first task record comprises only the first page; and
   displaying the first page in the second split-screen window based on the first page included in the first task record bound to the activity stack.

8. The method according to claim 7, wherein the first task record comprises at least one more page than the first page, the method further comprising:
   creating a second task record;
   moving the first page to the second task record;
   binding the second task record to the activity stack; and
   displaying the first page in the second split-screen window based on the first page included in the second task record bound to the activity stack.

9. The method according to claim 8, wherein in the first task record, the second page is a page adjacent to the first page.

10. The method according to claim 1, wherein the first operation is an operation for triggering a split-screen mode, the second operation is a preset gesture operation, and the third operation is a sliding operation.

11. An apparatus comprising:
    a processing module configured to:
    in response to a first operation performed on a terminal device, control a screen of the terminal device to display at least two split-screen windows comprising a first split-screen window and a second split-screen window, wherein the first split-screen window displays a first page of a first application; and while the first-split-screen window and the second split-screen window are displayed on the screen, set the first page that is displayed on the first split-screen window to a preset state in response to a second operation performed on the first split-screen window, the preset state indicating that the first page is deliverable; and a display module configured to display the first page, in entirety, in the second split-screen window and display a second page of the first application in the first split-screen window in response to a third operation performed on the first page, wherein the second page is a previous page of the first page.

12. The apparatus according to claim 11, wherein the processing module is configured to:

in response to the second operation performed on the first split-screen window, determine whether the first page meets a preset condition; and set the first page to the preset state in response to determining that the first page meets the preset condition.

13. The apparatus according to claim 12, wherein the processing module is further configured to:

before setting the first page to the preset state in response to the second operation performed on the first split-screen window, determine a preset page list, wherein the preset page list comprises a page that is deliverable in the first application, and wherein the preset condition is that the preset page list comprises the first page.

14. The apparatus according to claim 12, wherein:

the processing module is further configured to:
obtain a screenshot of the first page; and
process the screenshot of the first page to obtain a first floating window, wherein the first floating window captures the first page in its entirety; and the display module is further configured to:
in response to the third operation performed on the first page, move the first floating window to the second split-screen window; and
display the first page in entirety in the second split-screen window based on the first floating window.

15. The apparatus according to claim 14, wherein the display module is configured to:

determine whether an overlap ratio between the first floating window and the second split-screen window is greater than or equal to a preset threshold; and display the first page in the second split-screen window in response to determining that the overlap ratio between the first floating window and the second split-screen window is greater than or equal to the preset threshold.

16. The apparatus according to claim 11, wherein the display module is configured to:

create an activity stack when the third operation ends, wherein the activity stack is used to indicate a page displayed in the second split-screen window; and display the first page in the second split-screen window based on the activity stack.

17. The apparatus according to claim 16, wherein the display module is configured to:

obtain a first task record in which the first page is located;
determine whether the first task record comprises only the first page;
bind the first task record to the activity stack in response to determining that the first task record comprises only the first page; and
display the first page in the second split-screen window based on the first page included in the first task record bound to the activity stack.

18. The apparatus according to claim 17, wherein the processing module is further configured to:

determine that the first task record comprises at least one more page than the first page;
responsive to determining that the first task record comprises at least one more page than the first page:
create a second task record;
move the first page to the second task record;
bind the second task record to the activity stack; and
display the first page in the second split-screen window based on the first page comprised in the second task record bound to the activity stack.

19. The apparatus according to claim 18, wherein in the first task record, the second page is a page adjacent to the first page.

20. The apparatus according to claim 11, wherein the first operation is an operation for triggering a split-screen mode, the second operation is a preset gesture operation, and the third operation is a sliding operation.

* * * * *